3,817,781
CERAMIC TREATING PROCESS AND PRODUCT PRODUCED THEREBY

Peter K. Church, Cascade, and Oliver J. Knutson, Colorado Springs, Colo., assignors to Kaman Sciences Corporation, Colorado Springs, Colo.
No Drawing. Original application June 1, 1967, Ser. No. 642,704. Divided and this application Apr. 16, 1970, Ser. No. 33,120

Int. Cl. C04b *35/00*
U.S. Cl. 117—169                                    23 Claims

ABSTRACT OF THE DISCLOSURE

A new ceramic treatment process and product and, more particularly, a process for treating underfired porous partially vitrified relatively soft machinable refractory ceramic materials to produce hardened dimensionally stable end products at relatively low temperatures and the ceramic materials produced thereby which are suitable for application as bearings for undersea submergence, low temperature bearings for arctic vehicular and machinery applications, precision bearings for space use and liquid metal lubricated systems. The soft ceramics can be machined and shaped in the soft state and hardened by the process of this invention at temperatures well below normal vitrification temperatures with virtually no change in dimensions from the machined untreated ceramic to the treated and hardened end product. Other products produced by the process of this invention produce articles having a very dense surface capable of taking a high polish and other products have resulted in an abrasive or polishing stone having superior qualities to those of the Arkansas stones in respect to both speed of metal removal and degree of polishing or sharpening. In addition, coarser or finer grades are obtainable compared to a single grade of Arkansas stone. Other products produced by this process have negative temperature coefficients becoming very good electrical and heat conductors at high temperatures.

CROSS REFERENCE TO RELATED APPLICATIONS

This application is a division of Ser. No. 642,704 filed June 1, 1967, abandoned in favor of continuation application Ser. No. 63,998 filed June 18, 1970.

In accordance with the present invention, the process of treating underfired porous partially vitrified relatively soft refractory ceramic comprises the steps of shaping an underfired partially vitrified relatively soft refractory ceramic into a predetermined shape, impregnating the shaped ceramic with phosphoric acid and curing the impregnated ceramic at temperatures of at least 600° F., but below vitrification temperatures for a time sufficient to drive out the moisture and produce a hard ceramic.

Ceramic materials normally undergo substantial dimensional changes during the usual firing or vitrification steps. Thus, it has heretofore been extremely difficult to produce precision parts or intricate shapes from ceramics. Precision parts had to be shaped slightly oversize before firing. After firing, the parts required further machining with diamond cutting wheels or by using lapping methods. Many intricate shapes were just not available since thin sections of parts would crack during firing.

In accordance with the present invention, it has been found that underfired or so-called machinable grade refractory ceramics can be shaped while in the relatively soft state and then impregnated and heat treated to produce a ceramic having all the characteristics of a vitrified ceramic without the usual change in dimensions. The process of the instant invention appears to be useful in the treatment of such refractory ceramic materials as the oxides of aluminum, beryllium, zirconium, titanium, magnesium and the like. These materials in the commercially available machinable grade are quite soft and easily broken. Also, in the soft state, they can be readily cut with carbide cutting tools, drilled, filed, sanded and otherwise formed to practically any desired shape. One such aluminum and beryllium oxide material is available from Coors Ceramic Company of Golden, Colorado. When the machinable ceramics are treated by the method of this invention, they become very hard, approximating highly vitrified ceramic and, in addition, will retain the original machined and pre-treated dimensions. The treated material becomes so hard that the only practical method to do further machining is with diamond cutting wheels or by using lapping techniques.

The commercial value of the instant invention is readily seen when it is recognized that close tolerances on many intricate vitrified ceramic parts can only be obtained by machining with diamond cutting methods after firing. This is the case since there is considerable shrinkage which occurs during the firing. Also, there are many desired shapes which cannot be economically cast or molded during the firing process. In addition, it is often not feasible to construct molding dies for small quantities of a particular part. The method of the present invention in contrast thereto permits easy machining of parts to exact tolerances and then hardening the part without change in original dimensions.

It is, therefore, the principal object of this invention to provide an improved process for shaping, treating and hardening of machinable ceramics which avoids one or more of the disadvantages of prior art methods of producing close tolerance hardened shaped ceramic parts.

A further object of the present invention is to provide an improved process of producing hardened ceramic articles of manufacture of predetermined shapes, of predetermined characteristics and of predetermined dimensions.

Another object is to provide an improved method of producing close tolerance ceramic shapes of selected hardness, porosity and surface characteristics.

A still further object of the invention is to provide an improved process for the production of ceramic bearings capable of use with or without lubricants in hostile environments.

A further object of the invention is to provide an improved process for the production of an improved abrasive or polishing stone.

A further object of the invention is to provide a process for the production of a refractory ceramic oxide material having a negative temperature coefficient of electrical and heat conduction.

For a better understanding of the present invention, together with other and further objects thereof, reference is had to the following description, and its scope will be pointed out in the appended claims.

This invention is directed to a process and product involving a new type of ceramic material that is formed by chemically impregnating a relatively soft porous, underfired refractory oxide base material, followed by a low temperature cure. The resulting ceramic structure formed in this manner has been shown to exhibit extreme hardness, a high compressive strength and a dimensionally stable material over a wide temperature range. In addition, a number of these new ceramic materials show an inherently small coefficient of friction coupled with a very low wear rate characteristic.

Parts can be economically fabricated of this new material in a wide variety of intricate shapes and sizes. This is most easily accomplished by machining the relatively soft and porous refractory oxide base material to the final dimensions desired using conventional high speed steel or carbide tooling. The machined pieces are then chemically treated and cured at a temperature substantially below that used for normal ceramic vitrification.

One of the unique features of this chemical treatment and hardening method is that virtually no change will occur in the original dimensions of the machined part during the hardening process. Therefore, expensive diamond machining of the finished hardened part is eliminated.

These new ceramic materials will withstand repeated water quenching from 1000° F. as well as prolonged exposure to temperature extremes of 2000° F. to −300° F. Mohs scale hardness is in excess of 9, normally being about equal to that of a silicon carbide. Rockwell hardness can be as high as A–85 to A–90, with associated compressive strengths in excess of 125,000 p.s.i.

In addition to their use for the manufacture of precision parts, many of these ceramics exhibit excellent characteristics for low friction and low wear rate bearing and seal applications; in particular, journal bearings, thrust bearings and sliding type bearings and seals. When used in this manner, lubrication may be by means of a wide variety of conventional and non-conventional lubricants. Among those successfully tested to date include: tap water, sea water, alcohol, kerosene, polyethylene glycol trichloroethylene, lubricating oils, silicone fluids and liquid metals. Solid lubricants have been used with good results at temperatures up to about 2000° F. In addition, lightly loaded bearings have been operated for limited periods at high speed without lubrication.

Life tests of sleeve-type bearings have been and still are currently in progress. However, to date wear has been too low to obtain quantitative data, even after many months' time. Rub-shoe type wear rate tests have consequently been conducted and have shown exceptionally low wear rate characteristics. For example, a ceramic shoe of this invention riding on a ceramic wheel of the same material exhibited many times less wear than a bearing bronze shoe riding against a steel wheel using oil as the lubricating media. Also, unlike a conventional bronze-steel bearing combination, very heavy loads can be applied to many of the ceramic-to-ceramic material bearings without their showing any tendency toward galling, even when running with such poor lubricants as alcohol or water.

A special variation in treatment of this invention has also been found that will produce a honing or finishing material that appears to be superior in several respects to both natural and artificially produced grinding stones. For example, one such ceramic will remove metal far more rapidly than will an Arkansas stone, while at the same time producing a finer and more highly polish finish. Another ceramic material of this invention displays a wide variation in electrical and heat conduction with relatively small changes in temperature.

The basic method employed for producing the new ceramic materials consists of chemically impregnating a porous, refractory oxide structure followed by a low temperature cure. The porous refractory acts as the skeletal framework around which the final ceramic structure is formed.

The simplest chemical hardening method consists of impregnating the porous refractory structure with a solution of phosphoric acid. The thoroughly impregnated material is then cured in an oven with the final temperature reaching at least 600–1000° F., or higher. With a suitable refractory base material, this simple acid treatment will produce a hard ceramic body having numerous uses.

A more dense, harder and structurally stronger ceramic can be formed by impregnating the porous base material with one or more refractory oxides prior to the final acid treatment. This may be accomplished by impregnation of the porous structure with a water soluble metal salt solution and subsequently converting to the oxide by simply elevating the temperature to the required conversion point. Normally, this salt to oxide conversion will take place at a temperature less than about 1000° F.

X-ray diffraction tests indicate that these chemical treatment methods form a new microcrystalline structure or at least a very close bond between the added oxides, and/or phosphoric acid and the porous refractory skeletal structure.

As mentioned previously, the ceramic material is built around a porous refractory base material that functions as the skeletal structure. The types of such materials that are suitable for use in the present invention include various grades of alumina, titania, beryllia magnesia, magnesium silicate and stabilized zirconia. Silica has been tested but does not provide satisfactory results. These materials were obtained from the manufacturer in an "underfired" or "machinable" form. In this condition, these materials were normally found to be soft enough to allow machining by conventional means, and exhibited a relatively high effective porosity (10% to 50%) to allow for subsequent chemical treatment by the process of this invention. Table I lists the major type designation, manufacturer, hardness, porosity and fabrication method for each of the skeletal refractory materials tested.

TABLE I.—UNDERFIRED POROUS REFRACTORY BASE MATERIALS

| Base material | Manufacturer's type designation | Manufacturer | Major oxide | Other oxides | Sintering temp., °F. | Effective porosity, percent | Mols, hardness | Remarks |
|---|---|---|---|---|---|---|---|---|
| Alumina | AHP, 99 | Coors | 99% $Al_2O_3$ | 0.5% $SiO_2$<br>0.2% CaO<br>0.2% MgO | 2,670 | 45.7 | 2,3 | Isostatic, pressed. |
| Do | AP, 99, L3 | do | 99% $Al_2O_3$ | | 2,570 | 42.4 | 2,3 | Extruded. |
| Do | AP, 99, 11 | do | 99% $Al_2O_3$ | | 1,700 | | 0,1 | Do. |
| Do | AP, 99, 12 | do | 99% $Al_2O_3$ | | 2,130 | | 1 | Do. |
| Do | AP, 99, L1 | do | 99% $Al_2O_3$ | | 2,642 | | | Do. |
| Do | AP, 99, L2 | do | 99% $Al_2O_3$ | | 2,670 | | 5,6 | Do. |
| Do | AP, 99C, L1 | do | 99% $Al_2O_3$ | | 2,642 | | 4,5 | Cast. |
| Do | AP, 99C, 12 | do | 99% $Al_2O_3$ | | 2,130 | | | Do. |
| Do | AP, 99C, L3 | do | 99% $Al_2O_3$ | | 2,570 | | | Do. |
| Do | AP, 995, L3 | do | 99.5% $Al_2O_3$ | | 2,570 | | | Extruded. |
| Do | AP, 997, L3 | do | 99.7% $Al_2O_3$ | | 2,570 | | | Cast. |
| Do | AP, 94, 11 | do | 94% $Al_2O_3$ | 3.75% $SiO_2$<br>0.9% CaO<br>0.75% MgO<br>0.5% $ZrO_2$<br>0.1% $Fe_2O_3$ | 1,700 | 33.1 | 2,3 | Extruded. |
| Do | AP, 94, 12 | do | 94% $Al_2O_3$ | 3.75% $SiO_2$<br>0.9% CaO<br>0.75% MgO<br>0.5% $ZrO_2$<br>0.1% $Fe_2O_3$ | 2,130 | 33.0 | 2,3 | Do. |
| Do | AP, 94, 12 (Isostatic). | do | 94% $Al_2O_3$ | 3.75% $SiO_2$<br>0.9% CaO<br>0.75% MgO<br>0.5% $ZrO_2$<br>0.1% $Fe_2O_3$ | 2,130 | 44.1 | 2,3 | Isostatic, pressed. |

TABLE I—Continued

| Base material | Manufacturer's type designation | Manufacturer | Major oxide | Other oxides | Sintering temp., °F. | Effective porosity, percent | Mols, hardness | Remarks |
|---|---|---|---|---|---|---|---|---|
| Alumina | AP, 85, 11 | Coors | 85% Al₂O₃ | 10% SiO₂, 2.75% MgO, 1.25% CaO, 0.75% BaO, 0.25% Fe₂O₃ | 1,700 | 33.4 | 2,3 | Extruded. |
| Do | AlSiMag 614 (underfired) | Am. Lava Corp | 96% Al₂O₃ | | >2,000 | | 6,7 | Too hard for easy machining. |
| Do | AlSiMag 614 (green) | do | 96% Al₂O₃ | SiO, MgO, CaO | 2,000 | | 1,2 | Ordered green, fired for 20 minutes at 2,000 F. Extruded rod. |
| Do | AlSiMag 393 | do | 90% Al₂O₃ | | | | 4,5 | |
| Do | AlSiMag 548 | do | 99% .8Al₂O₃ | | | | | |
| Beryllia | BP-96-11 | Coors | 96% BeO | | 1,700 | | 1,2 | Extruded. |
| Magnesia | 187E4 | Du-CoCeramics | 89% MgO | SiO₂ | 2,000 | | 1,2 | |
| Do | 187E77 | do | 96% MgO | SiO₂ | 2,000 | | 1,2 | |
| Magnesium silicate | AlSiMag 222 | Am. Lava Corp | MgO·SiO₂ | | | | 2,3 | |
| Silica | 3 porosity | Amersil, Inc | 99% SiO₂ | | | | 2,3 | Hot pressed. |
| Zirconia | 172H20 | Du-CoCeramics | 95% ZrO₂ | 5% CaO | | | 1,2 | Made from ZCA type F coarse grain zirconia-(CaO stabilized). |
| Titania | AlSiMag 192 (underfired) | Am. Lava Corp | 98% TiO₂ | SiO₂, MgO, CaO | 2,000 | | 2,3 | Ordered Green fired 2d minutes at 2,000° F. |

NOTE.—American Lava Corp.—Chattanooga, Tenn.; Amerisil, Inc.—Hillside, New Jersey; Coors—Golden, Colorado; Du-Co Ceramics—Saxonburg, Penn.

These materials are fabricated by one or more of several commercially used methods such as powder pressing, extrusion, isostatic forming or slip casting. The important factor, however, is that formed or pressed oxide be only partially sintered since optimum sintering will result in a dense body with insufficient porosity to be usable in the chemical treatment method of this invention.

In addition to the alumina, beryllia, magnesia, titania and zirconia materials, it is anticipated that many of the other partially sintered refractory oxides would make applicable skeletal structures for the improved ceramic material. Among these would be the oxides of barium, calcium, cerium, chromium, cobalt, gallium, hafnium, lanthanum, manganese, nickel, niobium, tantalum, thorium, tin, uranium, vanadium, ytrrium and zinc. Also, many of the complex-refractory oxides should be suitable base materials. Of the complex-refractories, only the magnesium silicate has been tested to date. Other complex-refractories that may be suitable if produced in a porous, partially sintered (under-fired) form are aluminum silicate, aluminum titanate, barium aluminate, barium silicate, barium zirconate, beryllium aluminate, beryllium silicate, beryllium titanate, beryllium zirconate, calcium chromite, calcium phosphate, calcium silicate, calcium titanate, calcium zirconate, cobalt aluminate, magnesium aluminate, magnesium chromite, magnesium ferrite, magnesium lanthanate, magnesium silicate, magnesium titanate, magnesium zirconate, magnesium zirconium silicate, nickel aluminate, potassium aluminum silicate, strontium aluminate, strontium phosphate, strontium zirconate, thorium zirconate, zinc aluminate, zinc zirconium silicate and zirconium silicate.

The novel process according to the invention is particularly adapted to the treating of porous, partially vitrified refractory ceramics such as the oxides of aluminum, barium, beryllium, calcium, cerium, chromium, cobalt, gallium, hafnium, lanthanum, magnesium, manganese, nickel, niobium, tantalum, thorium, tin, titanium, uranium, vanadium, yttrium, zinc and zirconium and mixtures thereof. The oxides may be substantially pure or may contain or have small amounts of impurities or additives, such as an oxide of a metal other than that of the body such as copper, iron, chromium, manganese, nickel, titanium, magnesium, cobalt, cadmium and the like and/or other salts of such metals which ultimately will convert to oxides at least during the final curing step. The process of this invention also contemplates the addition of small amounts of additives such as a salt of a metal other than that of the body and convertible to an oxide such as the chlorides and nitrates of aluminum, copper, chromium, cobalt, magnesium, molybdenum, nickel, tin and zirconium which are added to the ceramic during treatment. It appears that the higher purity refractory ceramics are preferable where maximum hardness is desired.

The process of this invention comprises usually the forming of the untreated ceramic into a predetermined shape. It will be understood that, while precast machinable stock may be used, it is possible to precast to intricate shapes and prefire to an underfired condition before the ceramic is subjected to Applicant's process. The machinable ceramic, either stock or custom cast, is usually quite porous. The simplest method of chemically hardening the porous, underfired refractory structure is with a single acid treatment. The ceramic is impregnated with a concentrated phosphoric acid solution, usually of 85% concentration. The ceramic can be evacuated in a vacuum before immersion in the acid to hasten the impregnation or, as has been found to be particularly effective, the ceramic can be heated to from about 300° to about 600° F. and then immersed in the phosphoric acid solution. The heating causes a vacuum to be produced within the voids of the ceramic and the phosphoric acid will be drawn all through the ceramic upon immersion. While a considerably longer time is required, the ceramic also can be just immersed in the acid solution for a length of time sufficient for complete impregnation. Greater uniformity is achieved using the vacuum or heating impregnation techniques. When the part is thoroughly impregnated with acid, it is removed from the solution, excess acid on the surface is drained or wiped off.

Next, applicant's novel process comprises the controlled heat curing of the acid impregnated ceramic. The heating cycle is usually started around 150° F. and ends at about at least 900° F. The ceramic pieces are preferably placed in powdered asbestos, and the like, to minimize shock during the heating and cooling cycle. The powdered asbestos also serves to absorb moisture driven out of the ceramic as the temperature is raised. The temperature is raised during curing at a rate insufficient to craze the surface of the ceramic.

As pointed out, one of the unique features of the method of the invention is that virtually no dimensional changes occur in the machined piece during the hardening process. Therefore, expensive diamond-type machining of a hardened part is eliminated.

The property of physical hardness has been used as the primary means of determining effects of varying the underfired base materials, chemical treatment and curing methods. Table II below sets forth the hardness measurements for various materials which have been given a simple acid treatment.

have been used with good success. It is found that, once the heat treatment has been carried to above 850° F., the temperature may be increased to well above the normal

TABLE II.—HARDNESS MEASUREMENTS FOR SIMPLE ACID TREATMENT

| Sample | Base material | Type designation | Manufacturer | Major oxide | $H_3PO_4$ impregnation, percent | Mohs hardness | Rockwell hardness | Remarks |
|---|---|---|---|---|---|---|---|---|
| 21E | Alumina | AP-85-11 | Coors | 85% $Al_2O_3$ | 85 | 8-9 | A-66.5 | |
| 22E | do | AP-94-11 | do | 94% $Al_2O_3$ | 85 | 6-7 | A-69.5 | |
| 23E | do | AP-94-12 | do | 94% $Al_2O_3$ | 85 | 6-7 | A-71.0 | |
| 24E | do | AP-94-12 (isostatic) | do | 94% $Al_2O_3$ | 85 | 6-7 | A-57.5 | |
| 25E | do | AP-99-L3 | do | 99% $Al_2O_3$ | 85 | 8-9 | A-70.5 | |
| 20E | do | AHP-99 | do | 99% $Al_2O_3$ | 85 | 6-7 | A-52.5 | |
| A7 | do | AlSiMag 614 (underfired) | Am. Lava Corp. | 96% $Al_2O_3$ | 85 | 8-9 | A-73.7 | |
| 30E | do | AlSiMag 393 | do | 90% $Al_2O_3$ | 85 | 8-9 | Fractured | |
| 29E | do | AlSiMag 548 | do | 99.8% $Al_2O_3$ | 85 | 6-7 | do | |
| 26E | Beryllia | BP-96-11 | Coors | 96% BeO | 85 | 6-7 | do | |
| 8-1 | Magnesia | 187E4 | Du-Co Ceramics | 89% MgO | 85 | 4-5 | do | |
| 6-1 | do | 187E77 | do | 96% MgO | 85 | 4-5 | A-37.0 | |
| 28-E | Magnesium silicate | AlSiMag 222 | Am. Lava Corp. | $MgO \cdot SiO_2$ | 85 | | | |
| 27-E | Silica | #3 porosity | Amersil, Inc. | 99% $SiO_2$ | 85 | | Fractured | |
| 56-T | Titania | AlSiMag 192 (underfired) | Am. Lava Corp. | $TiO_2$ | 85 | 4-5 | do | |
| Z-1 | Zirconia | 172H20 | Du-Co Ceramics | 95% $ZrO_2$ | 85 | 8-9 | A-54.0 | |
| 44T | Alumina | AlSiMag (2000° F.) | Am. Lava Corp. | $MgO \cdot SiO_2$ | 85 | 5-6 | A-65.5 | |
| C60 | do | AP-99C-12 | Coors | 99% $Al_2O_3$ | 85 | | | |
| 146 | do | AP-99C-L1 | do | 99% $Al_2O_3$ | 85 | | A-66.4 | |

Several significant differences in the final product are achieved by the variation of portions of the treating process. While a pure or nearly pure ceramic material can be significantly hardened by a simple acid treatment, impregnation of the ceramic with a solution of a salt convertible to an oxide and converting same to the oxide will produce an increase in the hardness of the ceramic and the further acid treatment produces an even harder end product.

Where the ceramic material is impregnated with 85% or higher concentration of phosphoric acid and heat treated, a good bearing material is produced and two pieces of this same material will slide against one another with a low coefficient of friction. After such pieces are worn in for a short while, a shiny surface film is produced which remains shiny even at elevated temperatures. Where the more concentrated phosphoric acid is used, the resulting product is more dense with smaller unfilled pores. Where a relatively pure ceramic oxide is treated, the addition thereto of another oxide during treatment substantially increases the hardness of the finished product. While it is not completely known what occurs in the treating process, the pores of the underfired ceramic are believed to be filled or partially filled with a reaction product of the ceramic and the additive, if any, with the acid, probably a complex metal phosphate.

Where the ceramic material is impregnated with 85% or higher concentration of phosphoric acid having dissolved therein aluminum phosphate crystals until saturated at from 250°–400°F. and is then heat treated, a material is produced which cannot be polished to more than a dull finish, is quite porous and makes an excellent polishing and sharpening stone. This characteristic is also produced where the treatment with phosphoric acid is carried out with dilute acid solutions. It is believed that less reaction product is available to fill the pores, providing a more open and abrasive surface. Here again, the addition of another oxide during treatment substantially increases the hardness of the final product. The starting porous aluminum oxide grades have ranged from about 25% to about 60% effective porosity and, when subjected to a starved acid treatment, remain quite porous which may account for the excellent polishing and sharpening characteristics of the thus treated material.

The heat treating of the acid impregnated ceramic should be initiated at about 150° F. to 350° F. for a short period of time to drive out excess moisture and then the temperature is raised in steps for a series of time intervals until the final cure is accomplished at at least 500°–600° F. and preferably at at least 850°–900° F. The ceramic will become quite hard at 500° F.–600° F., but good electrical resistivity is not achieved until the ceramic is subjected to a temperature of 850° F. or higher. Temperatures above 1000° F. and as high as 3000° F.

vitrifying temperatures (e.g. 3000° F.) without producing any shrinkage or change in the original physical dimensions. Further, the high temperatures do not appear to affect the hardness of the material from that of the material heated to 850° F.

While the mechanism of applicant's process is not completely understood, it is believed that aluminum phosphate may be formed and deposited in the crystal lattice structure of the aluminum oxide as well as within the voids of the porous ceramic. Further, the phosphates of the impurities and/or additives may be formed and possibly as part of the lattice structure.

As pointed out above, the ceramic materials which are chemically treated and hardened according to one embodiment of the present process display the unique characteristic of exhibiting a low coefficient of friction when sliding against themselves. The coefficient of friction between identical pieces of the material is considerably less than when used in contact with any dissimilar ceramic or metal tested to date.

Although these materials may be operated dry where they are lightly loaded for limited periods of time, the starting friction is considerably higher than when a lubricating material is present. Lubrication may be by a number of different liquids such as tap water, sea water, kerosene, trichlorethylene, lubricating oils, silicone fluids and liquid metals. Dry lubricants such as molybdenum di-sulfide, graphite and the like are also suitable. It is possible also to form the lubricant in situ within the pore structure of the bearing.

The bearings can be easily and economically fabricated in a wide variety of shapes and sizes. The untreated ceramic material in the form of partially fired bars or plates is machined to size and shape using conventional high speed steel or carbide tooling. The machined pieces are then chemically treated and hardened at temperatures substantially below normal vitrification temperatures. The hardening occurs with substantially no change in dimensions, thus avoiding expensive diamond machinery of the finished part.

The ceramic bearing being fairly porous may be used as the lubricant reservoir analogous to that of sintered bronze bearings. In other instances, the bearing can be operated partially or totally submerged in the lubricant or the non-rotating member can be connected to an external lubricant reservoir.

Typical bearings fabricated of ceramic according to the present invention can withstand repeated water quenching from at least 1000° F., as well as prolonged exposure to temperatures as high as 2000°F. and as low as −300° F. The compressive strength is on the order of about 125,000 p.s.i. or better, and the hardness on the Moh's scale is between 9-10 or on the order of about A-80 to A-90 on the Rockwell scale.

The ceramic materials of Table I were subjected to several slightly different treatments according to this invention, which are: (1) impregnation in phosphoric acid alone; (2) one or more oxide impregnations followed by a single phosphoric acid treatment; or, (3) one or more oxide impregnations alone.

A typical acid impregnation process according to the present invention comprises heating the ceramic piece to about 300°–600° F. for about 20 minutes, the piece is then immersed in an 85% phosphoric acid solution while hot for about 40 minutes. The piece is then placed in an oven and progressively heated from 150° F. to about 1000° F. over a period of about 120 minutes. The piece is then cooled to room temperature.

A typical combination salt and acid impregnation process comprises heating the ceramic piece to about 250°–450° F. for about 20 minutes. The heated piece is then immersed in the salt solution for about 40 minutes. The piece is removed from the salt solution and cured progressively from 150° F. to 1000° F. over a period of 120 minutes. The previous step can be repeated if desired. The piece is then cooled to about 600° F. and immersed in an 85% phosphoric acid solution for about 40 minutes. The piece is then placed in an oven and cured over a temperature range of from 150° F. to 1000° F. over a period of about 120 minutes and subsequently cooled to ambient temperature in about 15 minutes.

Fully hardened samples were prepared according to the above treatments from the materials of Table I.

As previously stated, impurities existing in the base material appear to have an effect on the resultant hardness of the treated piece. Therefore, it was decided to artificially add refractory oxides to the porous base structure prior to treating with the acid. This was accomplished by impregnating the refractory base material with a nitrate, chloride, acetate or other highly water soluble salt of the oxide desired, and then converting the salt to the metal oxide by heating slowly to an elevated temperature. Following the oxide impregnation (which may consist of one or more salt treatment), the body was then treated with phosphoric acid in the same way as in the acid treatment alone.

Tables III, IV, V and VI show the effect of added oxides to Coors alumina products AHP–99, AP–99–L3, AP–94–11 and AP–85–11, respectively. In these tests, three impregnations of the saturated salts were used (to assure ample "loading" with the desired oxide), followed by the 85% phosphoric acid treatment.

It is interesting to note that these tables show a wide variation in hardness depending on the oxide treatment. In some cases, the hardness is considerably increased over that of the same base material treated with acid only, while in others, the increase is not so marked. The hardness that is obtained with the acid treatment only (no oxide impregnation) is listed for comparison purposes.

The $CrO_3$ treatment is of special interest in that, when used with the 99%, 94% and 85% $Al_2O_3$ base structures, the resulting ceramic is exceptionally high in hardness as compared to all other oxide impregnations tested. These four tables also show that the AHP–99 material (99% $Al_2O_3$) is the poorest choice for the base structure of these four types. However, since the AP–99–L3 is also a 99% alumina composition, it must be assumed that the hardness is not a factor of the refractory purity alone, but that other factors such as difference in effective pore size is probably responsible for some or all of the noted differences.

Tables VII, VIII and IX show the same type of data using aluminum oxides secured from the American Lava Corporation as their types 393, 548 and underfired 614. These are 90%, 99.8% and 96% $Al_2O_3$ compositions, respectively.

Hardness measurements obtained with Coors 96% beryllium oxide for four different salt impregnations is shown in Table X. It is interesting that this base material produces results about equal to the best alumina material tested (Coors AP–99), indicating that refractory skeletal structures other than alumina are definite candidates for the ceramic fabrication method.

Tables XI and XII show hardness results for oxide impregnated magnesia material. While the hardness values are quite low as compared to the alumina or the beryllia, this is to be expected since magnesia, even in its fully fired state is not a particularly hard material (Mohs 5½).

Tables XIII and XIV cover "AlSiMag" #222 magnesium silicate and "Amersil" 99% silica, respectively. For reasons not fully understood, refractory base materials containing a high percentage of silica do not appear to respond well to the chemical hardening method. Even in these two tests, however, the chromic oxide impregnation provided noticeably better results than the other impregnations used.

Table XV lists results obtained with a partially sintered, zirconia refractory base material. This particular underfired zirconia was fabricated from a calcia stabilized but coarse grain material. It is anticipated that a fine grained zirconia, and possibly a magnesium oxide stabilized type, would provide better results. Nevertheless, the zirconia also reacts to the chemical hardening method in the same general manner as does the alumina, magnesia and beryllia, and, to a lesser extent, the magnesia silicate and silica materials. Table XV-A lists results obtained with aluminum oxide material and Table XVB lists results obtained with titanium dioxide material.

With regard to the effect of pore size, it would be noted that the AHP–99 Coors material has quite large pores, compared to the other Coors material, being on the order of less than one micron compared with 2 to 3 microns for the AHP–99 materials. It would appear that the pore size would preferably be less than 2 microns and substantially uniform in size.

TABLE III.—HARDNESS MEASUREMENTS FOR VARIOUS OXIDE IMPREGNATIONS USING COORS AP–94–1 ALUMINA REFRACTORY BASE MATERIAL

[Acid treated hardness Mohs 8-9, Rockwell 70.7]

| Sample number | Oxide formed | Salt impregnation | No. salt impreg. | $H_3PO_4$ impregnation, percent | Mohs hardness | Rockwell hardness | Cracks | Remarks |
|---|---|---|---|---|---|---|---|---|
| 1 | $Al_2O_3$ | $Al(NO_3)_2$ | 3X | 85 | 9-10 | A-71.5 | None | |
| 7-1 | BeO | $BeCl_2$ | 3X | 85 | 9-10 | A-74.4 | do | |
| 5 | CaO | $Co(NO_3)_2$ | 3X | 85 | 8-9 | A-55 | do | |
| 3 | CdO | $Cd(NO_3)_2$ | 3X | 85 | 8-9 | A-63 | do | |
| C-1 | $CeO_2$ | $Ce(NO_3)_2$ | 3X | 85 | 9-10 | A-71.1 | do | |
| 9 | CoO | $Co(NO_3)_2$ | 3X | 85 | 8-9 | A-74.8 | do | |
| L-4 | $Cr_2O_3$ | $CrO_3$ | 3X | 85 | 9-10 | A-81.5 | do | |
| 7-3 | CuO | $Cu(NO_3)_2$ | 3X | 85 | 9-10 | A-61.0 | do | |
| 7 | $Fe_2O_3$ | $FeCl_3$ | 3X | 85 | 8-9 | A-72.5 | do | |
| 7-5 | $La_2O_3$ | $La(NO_3)_2$ | 3X | 85 | 8-9 | A-53.5 | Yes | |
| 7-7 | $Li_2O$ | $LiC_2H_3O_2$ | 3X | 85 | 8-9 | A-48.2 | Yes | |
| 11 | MgO | $Mg(C_2H_3O_2)_2$ | 3X | 85 | 9-10 | Fractured | Yes | |
| D-5 | $MgCr_2O_4$ | $MgCrO_4$ | 3X | 85 | 9-10 | A-73.8 | None | |
| 13 | NiO | $Ni(NO_3)_2$ | 3X | 85 | 9-10 | A-75.6 | do | |
| D-1 | SnO | $SnCl_2$ | 3X | 85 | 9-10 | A-71.7 | do | |
| 15 | SrO | $Sr(NO_3)_2$ | 3X | 85 | 8-9 | Fractured | Yes | |

TABLE III—Continued

| Sample number | Oxide formed | Salt impregnation | No. salt impreg. | $H_3PO_4$ impregnation, percent | Mohs hardness | Rockwell hardness | Cracks | Remarks |
|---|---|---|---|---|---|---|---|---|
| 7-9 | $ThO_2$ | $Th(NO_3)_4$ | 3× | 85 | 9-10 | A-73.5 | None | |
| 17 | $TiO_2$ | $Ti_2(C_2O_4)_3$ | 3× | 85 | 9-10 | A-73.5 | do | |
| 9-X | $WO_3$ | $H_4SiW_{18}O_{40}$ | 3× | 85 | 9-10 | A-72.1 | do | |
| Zn94 | ZnO | $ZnCl_2$ | 3× | 85 | 8-9 | A-73.8 | do | |
| D-3 | $ZrO_2$ | $ZrOCl_2$ | 3× | 85 | 9-10 | A-76.1 | do | |
| I-A | $Fe_2O_3 \cdot Cr_2O_3$ | (1)$FeCl_3$ plus (1)$CrO_3$ | 3× | 85 | 9-10 | A-77 | do | |

TABLE IV.—HARDNESS MEASUREMENTS FOR VARIOUS OXIDE IMPREGNATIONS USING COORS AP-85-11 ALUMINA REFRACTORY BASE MATERIAL

[Acid treated hardness Mohs 8-9, Rockwell A-65.9]

| Sample number | Oxide formed | Salt impregnation | No. salt impreg. | $H_3PO_4$ impregnation, % | Mohs hardness | Rockwell hardness | Cracks | Remarks |
|---|---|---|---|---|---|---|---|---|
| 8-4 | $Al_2O_3$ | $Al(NO_3)_2$ | 3× | 85 | 8-9 | A-71 | None | |
| 8-2 | $CeO_2$ | $Ce(NO_3)_2$ | 3× | 85 | 9-10 | A-74 | Yes | |
| 8-1 | $Cr_2O_3$ | $CrO_3$ | 3× | 85 | 9-10 | A-81 | None | |
| 8-5 | MgO | $Mg(C_2H_3O_2)_2$ | 3× | 85 | 8-9 | A-66 | Yes | Shattered during Rockwell test. |
| 8-6 | $TiO_2$ | $Ti(C_2O_4)_3$ | 3× | 85 | 8-9 | A-68 | Yes | Do. |
| 8-3 | $ZrO_2$ | $ZrOCl_2$ | 3× | 85 | 9-10 | A-72 | None | |

TABLE V.—HARDNESS MEASUREMENTS FOR VARIOUS OXIDE IMPREGNATIONS USING COORS AP-99-L3 ALUMINA REFRACTORY BASE MATERIAL

[Acid treated hardness Mohs 8-9, Rockwell A-70.5]

| Sample number | Oxide formed | Salt impregnation | No. salt impreg. | $H_3PO_4$ impregnation, percent | Mohs hardness | Rockwell hardness | Cracks | Remarks |
|---|---|---|---|---|---|---|---|---|
| L-4 | $CeO_2$ | $Ce(NO_3)_2$ | 3× | 85 | 8-9 | A-69.1 | Yes | Exploded in oven. |
| L-1 | $Cr_2O_3$ | $CrO_3$ | 3× | 85 | 9-10 | A-80.5 | None | |
| L-3 | $MgCr_2O_4$ | $MgCrO_4$ | 3× | 85 | 9-10 | A-71.0 | do | |
| L-2 | $ZrO_2$ | $ZrOCl_2$ | 3× | 85 | 9-10 | A-60.1 | do | |

TABLE VI.—HARDNESS MEASUREMENTS FOR VARIOUS OXIDE IMPREGNATIONS USING COORS AHP-99 ALUMINA REFRACTORY BASE MATERIAL

[Acid treated hardness Mohs 5-6, Rockwell A-54.8]

| Sample number | Oxide formed | Salt impregnation | No. salt impregnation | $H_3PO_4$ impregnation, percent | Mohs hardness | Rockwell hardness | Cracks | Remarks |
|---|---|---|---|---|---|---|---|---|
| 2 | $Al_2O_3$ | $Al(NO_3)_2$ | 3× | 85 | 8-9 | A-60.0 | None | |
| 7-2 | BeO | $BeCl_2$ | 3× | 85 | 8-9 | A-57.0 | do | |
| 8-X | BeO | $Be(NO_3)_2$ | 3× | 85 | 6-7 | A-67.9 | do | |
| 6 | CoO | $Co(NO_3)_2$ | 3× | 85 | 6-7 | Fractrued | do | |
| 4 | CdO | $Cd(NO_3)_2$ | 3× | 85 | 4-5 | A-55.0 | do | |
| C-5 | $CeO_2$ | $Ce(NO_3)_2$ | 3× | 85 | 8-9 | A-54.9 | do | |
| 10 | CoO | $Co(NO_3)_2$ | 3× | 85 | 6-7 | A-62.2 | do | |
| K-7 | $Cr_2O_3$ | $CrO_3$ | 3× | 85 | 9-10 | A-69.2 | do | |
| 7-4 | CuO | $Cu(NO_3)_2$ | 3× | 85 | 4-5 | A-47.1 | do | |
| 8 | $Fe_2O_3$ | $FeCl_3$ | 3× | 85 | 8-9 | A-45.2 | do | |
| 7-6 | $La_2O_3$ | $La(NO_3)_2$ | 3× | 85 | 8-9 | A-59.0 | do | |
| 7-8 | $Li_2O$ | $LiC_2H_3O_2$ | 3× | 85 | 5-6 | A-53.1 | Yes | |
| 12 | MgO | $Mg(C_2H_3O_2)_2$ | 3× | 85 | 6-7 | A-52.3 | None | |
| K-3 | $MgCr_2O_4$ | $MgCrO_4$ | 3× | 85 | 9-10 | A-63.5 | do | |
| 14 | NiO | $Ni(NO_3)_2$ | 3× | 85 | 7-8 | A-59.6 | do | |
| 6-X | PbO | $Pb(NO_3)_2$ | 3× | 85 | 5-6 | A-55.1 | do | |
| 4-X | $Sb_2O_3$ | $SbCl_3$ | 3× | 85 | 6-7 | A-59.4 | do | |
| D-2 | SnO | $SnCl_2$ | 3× | 85 | 8-9 | A-52.0 | do | |
| 1b | SrO | $Sr(NO_3)_2$ | 3× | 85 | 8-9 | A-26.0 | do | |
| 7-9 | $ThO_2$ | $Th(NO_3)_4$ | 3× | 85 | 9-10 | A-58.7 | do | |
| 18 | $TiO_2$ | $Ti_2(C_2O_4)_3$ | 3× | 85 | 8-9 | A-53.3 | do | |
| 10-X | $WO_3$ | $H_4SiW_{18}O_{40}$ | 3× | 85 | 8-9 | A-69.0 | do | |
| Zn-1 | ZnO | $Zn(NO_3)_2$ | 3× | 85 | 8-9 | A-48.1 | do | |
| An99 | ZnO | $ZnCl_2$ | 3× | 85 | 8-9 | A-72.8 | do | |
| K-5 | $ZrO_2$ | $ZrOCl_2$ | 3× | 85 | 8-9 | A-61.7 | do | |

TABLE VII.—HARDNESS MEASUREMENTS FOR VARIOUS OXIDE IMPREGNATIONS USING ALSIMAG 614 (UNDERFIRED) ALUMINA REFRACTORY BASE MATERIAL *

[Acid treated hardness Mohs 8-9, Rockwell A-73.7]

| Sample number | Oxide formed | Salt impregnation | Number salt impreg. | $H_3PO_4$ impregnation, percent | Mohs hardness | Rockwell hardness | Cracks | Remarks |
|---|---|---|---|---|---|---|---|---|
| A-11 | $CeO_2$ | $Ce(NO_3)_2$ | 3× | 85 | 8-9 | A-69.0 | None | Fractured during Rockwell test. |
| A-14 | $Cr_2O_3$ | $CrO_3$ | 3× | 85 | 9-10 | A-76.0 | do | |
| A-13 | CoO | $Co(NO_3)_2$ | 3× | 85 | 9-10 | A-73.0 | do | Do. |
| A-8 | $MgCr_2O_4$ | $MgCrO_4$ | 3× | 85 | 9-10 | A-65.5 | do | Do. |
| A-12 | NiO | $Ni(NO_3)_2$ | 3× | 85 | 7-8 | A-72.5 | do | Do. |
| A-10 | ZnO | $Zn(NO_3)_2$ | 3× | 85 | 6-7 | A-73.3 | do | |
| A-9 | $ZrO_2$ | $ZrOCl_2$ | 3× | 85 | 9-10 | A-68.0 | do | Do. |

*Fired at >2,000° F.

TABLE VIII.—HARDNESS MEASUREMENTS FOR VARIOUS OXIDE IMPREGNATIONS USING ALSIMAG 393 ALUMINA REFRACTORY BASE MATERIAL

[Acid treated hardness Mohs 8-9, Rockwell A-N.M., i.e., not measured]

| Sample number | Oxide formed | Salt impregnation | No. salt impreg. | H₃PO₄ impregnation, percent | Mohs hardness | Rockwell hardness | Cracks | Remarks |
|---|---|---|---|---|---|---|---|---|
| A-4 | Cr₂O₃ | CrO₃ | 3× | 85 | 9-10 | A-77.0 | None | |
| A-5 | MgCr₂O₄ | MgCrO₄ | 3× | 85 | 9-10 | Shattered | do | |
| A-6 | ZrO₂ | ZrOCl₂ | 3× | 85 | 8-9 | A-68.5 | do | |

TABLE IX.—HARDNESS MEASUREMENTS FOR VARIOUS OXIDE IMPREGNATIONS USING ALSIMAG 548 ALUMINA REFRACTORY BASE MATERIAL

[Acid treated hardness Mohs 6-7, Rockwell A-N.M.]

| Sample number | Oxide formed | Salt impregnation | No. salt impreg. | H₃PO₄ impregnation, percent | Mohs hardness | Rockwell hardness | Cracks | Remarks |
|---|---|---|---|---|---|---|---|---|
| A-1 | Cr₂O₃ | CrO₃ | 3× | 85 | 8-9 | Fractured | None | |
| A-2 | MgCr₂O₄ | MgCrO₄ | 3× | 85 | 8-9 | do | do | |
| A-3 | ZrO₂ | ZrOCl₂ | 3× | 85 | 8-9 | A-76.4 | do | |

TABLE X.—HARDNESS MEASUREMENTS FOR VARIOUS OXIDE IMPREGNATIONS USING COORS BP-96-11 BERYLLIA REFRACTORY BASE MATERIAL

[Acid treated hardness Mohs 6-7, Rockwell A-N. M.]

| Sample number | Oxide formed | Salt impregnation | No. salt impreg. | H₃PO₄ impregnation, percent | Mohs hardness | Rockwell hardness | Cracks | Remarks |
|---|---|---|---|---|---|---|---|---|
| B-1 | Al₂O₃ | Al(NO₃)₃ | 3× | 85 | 8-9 | A-74 | None | |
| B-2 | Cr₂O₃ | CrO₃ | 3× | 85 | 9-10 | A-81 | do | Shattered in Rockwell testing. |
| B-4 | MgCrO₄ | MgCrO₄ | 3× | 85 | 9-10 | A-71 | do | |
| B-3 | ZrO₂ | ZrOCl₂ | 3× | 85 | 9-10 | A-75 | do | Do. |

TABLE XI.—HARDNESS MEASUREMENTS FOR VARIOUS OXIDE IMPREGNATIONS USING DU-CO 89% MAGNESIA REFRACTORY BASE MATERIAL

[Acid treated hardness Mohs 4-5, Rockwell—Fractured]

| Sample number | Oxide formed | Salt impregnation | No. salt impreg. | H₃PO₄ impregnation, percent | Mohs hardness | Rockwell hardness | Cracks | Remarks |
|---|---|---|---|---|---|---|---|---|
| 9-4 | Al₂O₃ | Al(NO₃)₃ | 3× | 85 | 4-5 | Fractured | None | |
| 9-2 | Cr₂O₃ | CrO₃ | 3× | 85 | 8-9 | do | do | |
| 9-3 | MgCr₂O₄ | MgCrO₄ | 3× | 85 | 8-9 | A-51.5 | do | |
| 9-6 | TiO₂ | Ti₂(C₂O₄)₃ | 3× | 85 | N.M. | N.M. | | MgO base disintegrated. |
| 9-5 | ZrO₂ | ZrOCl₂ | 3× | 85 | N.M. | N.M. | | Do. |

TABLE XII.—HARDNESS MEASUREMENTS FOR VAROUS OXIDE IMPREGNATIONS USING DU-CO 96% MAGNESIA REFRACTORY BASE MATERIAL

[Acid treated hardness Mohs 4-5, Rockwell A-37.0]

| Sample number | Oxide formed | Salt impregnation | No. salt impreg. | H₃PO₄ impregnation, percent | Mohs hardness | Rockwell hardness | Cracks | Remarks |
|---|---|---|---|---|---|---|---|---|
| 6-4 | Al₂O₃ | Al(NO₃)₃ | 3× | 85 | 3-4 | Fractured | None | |
| 6-2 | Cr₂O₃ | CrO₃ | 3× | 85 | 6-7 | do | do | |
| 6-3 | MgCr₂O₄ | MgCrO₄ | 3× | 85 | 6-7 | A-44.25 | do | |
| 6-6 | TiO₂ | Ti₂(C₂O₄)₃ | 3× | 85 | N.M. | N.M. | | Dissolved. |
| 6-5 | ZrO₂ | ZrOCl₂ | 3× | 85 | N.M. | N.M. | | Do. |

TABLE XIII.—HARDNESS MEASUREMENTS FOR VARIOUS OXIDE IMPREGNATIONS USING ALSIMAG 222 MAGNESIUM-SILICATE REFRACTORY BASE MATERIAL

[Acid treated hardness Mohs 2-3, Rockwell A-N.M.]

| Sample number | Oxide formed | Salt impregnation | No. salt impreg. | H₃PO₄ impregnation, percent | Mohs hardness | Rockwell hardness | Cracks | Remarks |
|---|---|---|---|---|---|---|---|---|
| MS-1 | Al₂O₃ | Al(NO₃)₃ | 3× | 85 | 3-4 | Fractured | None | |
| MS-2 | Cr₂O₃ | CrO₃ | 3× | 85 | 8-9 | do | do | |
| MS-3 | MgCr₂O₄ | MgCrO₄ | 3× | 85 | 7-8 | A-41 | do | Shattered during Rockwell test. |
| MS-4 | ZrO₂ | ZrOCl₂ | 3× | 85 | 1-2 | Fractured | do | |

TABLE XIV.—HARDNESS MEASUREMENTS FOR VARIOUS OXIDE IMPREGNATIONS USING AMERSIL NO. 3 POROSITY SILICA REFRACTORY BASE MATERIAL

[Acid treated hardness Mohs N.M., Rockwell A-N.M.]

| Sample number | Oxide formed | Salt impregnation | No. salt impreg. | H₃PO₄ impregnation, percent | Mohs hardness | Rockwell hardness | Cracks | Remarks |
|---|---|---|---|---|---|---|---|---|
| 8-2 | Al₂O₃ | Al(NO₃)₃ | 3× | 85 | 4-5 | Fractured | None | |
| 8-6 | CeO₂ | Ce(NO₃)₃ | 3× | 85 | 4-5 | do | do | |
| 8-1 | Cr₂O₃ | CrO₃ | 3× | 85 | 6-7 | A-54.0 | do | |
| 8-3 | MgO | Mg(C₂H₃O₂)₂ | 3× | 85 | 4-5 | Fractured | do | |
| 8-5 | MgCrO₄ | MgCrO₄ | 3× | 85 | 6-7 | do | do | |
| 8-4 | ZrO₂ | ZrOCl₂ | 3× | 85 | 4-5 | do | do | |

TABLE XV.—HARDNESS MEASUREMENTS FOR VARIOUS OXIDE IMPREGNATIONS USING DU-CO ZIRCONIA REFRACTORY BASE MATERIAL

[Acid treated hardness Mohs 8-9, Rockwell A-54.0]

| Sample number | Oxide formed | Salt impregnation | No. salt impreg. | $H_3PO_4$ impregnation, percent | Mohs hardness | Rockwell hardness | Cracks | Remarks |
|---|---|---|---|---|---|---|---|---|
| Z-4 | $Al_2O_3$ | $Al(NO_3)_2$ | 3X | 85 | 6-7 | A-46.8 | None | |
| Z-2 | $Cr_2O_3$ | $CrO_3$ | 3X | 85 | 9-10 | A-66.2 | do | |
| Z-7 | MgO | $Mg(C_2H_3O_2)_2$ | 3X | 85 | 6-7 | Fractured | do | |
| Z-3 | $MgCr_2O_4$ | $MgCrO_4$ | 3X | 85 | 9-10 | A-58.0 | do | |
| Z-8 | $ThO_2$ | $Th(NO_3)_2$ | 3X | 85 | 6-7 | A-55.3 | do | |
| Z-6 | ZnO | $Zn(NO_3)_2$ | 3X | 85 | 6-7 | A-44.7 | do | |
| Z-5 | $ZrO_2$ | $ZrOCl_2$ | 3X | 85 | 8-9 | A-60.3 | do | |

TABLE XV-A.—HARDNESS MEASUREMENTS FOR VARIOUS OXIDE IMPREGNATIONS USING ALSIMAG 614 96% $Al_2O_3$ REFRACTORY BASE MATERIAL PARTIALLY SINTERED AT 2,000° F.

[Acid treated hardness Mohs 8-9, Rockwell A-73.7]

| Sample number | Oxide formed | Salt impregnation | No. salt impreg. | $H_3PO_4$ impregnation, percent | Mohs hardness | Rockwell hardness | Cracks | Remarks |
|---|---|---|---|---|---|---|---|---|
| 40-T | $Cr_2O_3$ | $CrO_3$ | 3X | 85 | 9-10 | A-82.5 | None | |
| 41-T | $ZrO_2$ | $ZrOCl_2$ | 3X | 85 | 9-10 | A-74.5 | do | |
| 42-T | $MgCr_2O_4$ | $MgCrO_4$ | 3X | 85 | 9-10 | A-67.5 | do | |
| 43-T | NiO | $Ni(1)(NO_3)_2$ | 3X | 85 | 9-10 | A-69.5 | do | |
| 44-T | | None | | 85 | 5-6 | A-65.5 | do | |

TABLE XV-B.—HARDNESS MEASUREMENTS FOR VARIOUS OXIDE IMPREGNATIONS USING ALSIMAG 192 TITANIA 98% $TiO_2$ REFRACTORY BASE MATERIAL PARTIALLY SINTERED AT 2,000° F.

[Acid treated hardness Mohs 4-5, Rockwell A-N.M.]

| Sample number | Oxide formed | Salt impregnation | No. salt impreg. | $H_3PO_4$ impregnation, percent | Mohs hardness | Rockwell hardness | Cracks | Remarks |
|---|---|---|---|---|---|---|---|---|
| 50-T | $Cr_2O_3$ | $CrO_3$ | 3X | 85 | 8-9 | A-77.5 | None | |
| 51-T | $ZrO_2$ | $ZrOCl_2$ | 3X | 85 | 8-9 | A-66.0 | do | |
| 52-T | BeO | $Be(NO_3)_2$ | 3X | 85 | 6-7 | A-69.0 | do | |
| 53-T | MgO | $Mg(C_2H_3O_2)_2$ | 3X | 85 | 6-7 | Fractured | | |
| 54-T | $Al_2O_3$ | $Al(NO_3)_2$ | 3X | 85 | 5-6 | do | | |
| 55-T | $MgCr_2O_4$ | $MgCrO_4$ | 3X | 85 | 9-10 | A-65.0 | | |
| 56-T | | None | | 85 | 4-5 | Fractured | | |

Tables XVI–XXIX show the hardness of selected base materials which have been treated with multiple salt impregnations to illustrate the effect on hardness of varying the amount of added oxide prior to the final acid treatment. In the preceding Tables, all samples were impregnated with the salt solution three times. The following impregnations were varied from as few as one time to a maximum of eleven times. The base materials and oxide impregnations tested in this manner were selected from the materials of Table I.

Table XVI shows the effect of I through II chromic oxide impregnations using Coors AP-99-L3 alumina base material, while Table XVI-A shows the effect of 1 through 8 chromic oxide impregnations with AP-94-II alumina base material and Table XVII shows 1 through 5 impregnations with AP-94-12 material. These tables show the definite increase in hardness with increase in number of oxide impregnations. The rate of increase in hardness is also seen to decrease as the number of impregnations increase. This would appear to follow since there is probably less and less interstitial space for the oxides with each successive treatment. Specific gravity and porosity tests bear this out.

TABLE XVI-A.—HARDNESS VARIATION WITH NUMBER OF CHROMIC OXIDE IMPREGNATIONS USING COORS AP-94-11 ALUMINA REFRACTORY BASE MATERIAL

| Sample No. | Oxide formed | Salt impregnation | No. salt impreg. | $H_3PO_4$ impregnation, percent | Mohs hardness | Rockwell hardness | Cracks | Remarks |
|---|---|---|---|---|---|---|---|---|
| L-8 | $Cr_2O_3$ | $CrO_3$ | 1X | 85 | 9-10 | A-76.4 | None | |
| L-9 | $Cr_2O_3$ | $CrO_3$ | 2X | 85 | 9-10 | A-80.7 | do | |
| 3-X | $Cr_2O_3$ | $CrO_3$ | 3X | 85 | 9-10 | A-81.8 | do | |
| | $Cr_2O_3$ | $CrO_3$ | 4X | 85 | 9-10 | | | |
| 5-X | $Cr_2O_3$ | $CrO_3$ | 5X | 85 | 9-10 | A-85.0 | None | |
| 6-X | $Cr_2O_3$ | $CrO_3$ | 6X | 85 | 9-10 | A-85.0 | do | |
| 7-X | $Cr_2O_3$ | $CrO_3$ | 7X | 85 | 9-10 | A-86.0 | do | |
| 8-X | $Cr_2O_3$ | $CrO_3$ | 8X | 85 | 9-10 | A-87.0 | do | |

TABLE XVI.—HARDNESS VARIATION WITH NUMBER OF CHROMIC OXIDE IMPREGNATIONS USING COORS AP-99-L3 ALUMINA REFRACTORY BASE MATERIAL

| Sample No. | Oxide formed | Salt impregnation | No. salt impreg. | $H_3PO_4$ impregnation, percent | Mohs hardness | Rockwell hardness | Cracks | Remarks |
|---|---|---|---|---|---|---|---|---|
| 80-L | $Cr_2O_3$ | $CrO_3$ | 1X | 85 | 9-10 | A-73.2 | None | |
| 81-L | $Cr_2O_3$ | $CrO_3$ | 3X | 85 | 9-10 | A-80.4 | do | |
| 82-L | $Cr_2O_3$ | $CrO_3$ | 5X | 85 | 9-10 | A-83.9 | do | |
| 83-L | $Cr_2O_3$ | $CrO_3$ | 7X | 85 | 9-10 | A-87.6 | | |
| 84-L | $Cr_2O_3$ | $CrO_3$ | 9X | 85 | 9-10 | A-88.3 | None | |
| 85-L | $Cr_2O_3$ | $CrO_3$ | 11X | 85 | 9-10 | A-88.9 | do | |

These tables show that there is very little difference in the hardness results obtained between the AP-94-11 and the AP-94-12 materials. The difference between these two base materials is in their sintering temperatures, respectively 1700° F., and 2130° F.

Table XVIII shows the results obtained with chromic oxide impregnations on Coors AHP-99 alumina material. While the hardness increases with the number of chromic oxide impregnations, the hardness numbers obtained for a given number of treatments is much less than those obtained with chromic oxide treatment of Coors AP-99-L3 material of Table XVI. Since these alumina materials are both 99% aluminum oxide, and both have the same effective porosity of about 40%, the differences measured must be a result of the different pore size. The AHP-99 material has larger pores on the order of 2–3 microns average while the AP-99-L3 average pore size is 0.6–0.7 microns.

TABLE XVII.—HARDNESS VARIATION WITH NUMBER OF OXIDE IMPREGNATIONS USING COORS AP-94-12 ALUMINA REFRACTORY BASE MATERIAL

| Sample No. | Oxide formed | Salt impregnation | No. salt impreg. | $H_3PO_4$ impregnation, percent | Mohs hardness | Rockwell hardness | Cracks | Remarks |
|---|---|---|---|---|---|---|---|---|
| L-7 | $Cr_2O_3$ | $CrO_3$ | 1× | 85 | 9-10 | A-75.8 | | |
| K-8 | $Cr_2O_3$ | $CrO_3$ | 2× | 85 | 9-10 | A-79.6 | | |
| L-4 | $Cr_2O_3$ | $CrO_3$ | 3× | 85 | 9-10 | A-81.5 | | |
| L-5 | $Cr_2O_3$ | $CrO_3$ | 4× | 85 | 9-10 | A-83.9 | | |
| 2-S | $Cr_2O_3$ | $CrO_3$ | 5× | 85 | 9-10 | A-86.0 | | |
| | | | 6× | 85 | | | | |
| 3-S | $Cr_2O_3$ | $CrO_3$ | 7× | 85 | 9-10 | A-83.0 | | |
| 4-S | $Cr_2O_3$ | $CrO_3$ | 9× | 85 | 9-10 | A-84.0 | | |
| 5-S | $Cr_2O_3$ | $CrO_3$ | 11× | 85 | 9-10 | A-85.0 | | |

TABLE XVIII.—HARDNESS VARIATION WITH NUMBER OF CHROMIC OXIDE IMPREGNATIONS USING COORS AHP-99 ALUMINA REFRACTORY BASE MATERIAL

| Sample No. | Oxide formed | Salt impregnation | No. salt impreg. | $H_3PO_4$ impregnation, percent | Mohs hardness | Rockwell hardness | Cracks | Remarks |
|---|---|---|---|---|---|---|---|---|
| O-6 | $Cr_2O_3$ | $CrO_3$ | 1× | 85 | | | | |
| L-1 | $Cr_2O_3$ | $CrO_3$ | 2× | 85 | 8-9 | A-57.4 | None | |
| O-7 | $Cr_2O_3$ | $CrO_3$ | 3× | 85 | 9-10 | A-69.2 | do | |
| L-2 | $Cr_2O_3$ | $CrO_3$ | 4× | 85 | 8-9 | A-68.7 | do | |
| O-8 | $Cr_2O_3$ | $CrO_3$ | 5× | 85 | 9-10 | A-73.0 | do | |
| | | | 6× | | | | | |
| 3-U | $Cr_2O_3$ | $CrO_3$ | 7× | 85 | 9-10 | A-80.0 | None | |
| | | | 8× | | | | | |
| 4-U | $Cr_2O_3$ | $CrO_3$ | 9× | 85 | 9-10 | A-76.0 | None | |
| | | | 10× | | | | | |
| 5-U | $Cr_2O_3$ | $CrO_3$ | 11× | 85 | 9-10 | A-79.0 | | |

TABLE XIX.—HARDNESS VARIATIONS WITH NUMBER OF ZIRCONIUM OXIDE IMPREGNATIONS USING COORS AP-94-12 ALUMINA REFRACTORY BASE MATERIAL

| Sample No. | Oxide formed | Salt impregnation | No. salt impreg. | $H_3PO_4$ impregnation, percent | Mohs hardness | Rockwell hardness | Cracks | Remarks |
|---|---|---|---|---|---|---|---|---|
| Y-1 | $ZrO_2$ | $ZrOCl_2$ | 1× | 85 | 8-9 | A-71.9 | None | |
| K-6 | $ZrO_2$ | $ZrOCl_2$ | 2× | 85 | 8-9 | A-74.6 | do | |
| 5-T | $ZrO_2$ | $ZrOCl_2$ | 3× | 85 | 9-10 | A-70.0 | do | |
| | | | 4× | | | | | |
| 6-T | $ZrO_2$ | $ZrOCl_2$ | 5× | 85 | 9-10 | A-73.0 | None | |
| | | | 6× | | | | | |
| 7-T | $ZrO_2$ | $ZrOCl_2$ | 7× | 85 | 9-10 | A-73.0 | None | |
| | | | 8× | | | | | |
| 8-T | $ZrO_2$ | $ZrOCl_2$ | 9× | 85 | 9-10 | A-80.5 | None | |
| | | | 10× | | | | | |
| 9-T | $ZrO_2$ | $ZrOCl_2$ | 11× | 85 | 9-10 | A-78.0 | None | |

TABLE XX.—HARDNESS VARIATIONS WITH NUMBER OF ZIRCONIUM OXIDE IMPREGNATIONS USING COORS AHP-99 ALUMINA REFRACTORY BASE MATERIAL

| Sample No. | Oxide formed | Salt impregnation | No. salt impreg. | $H_3PO_4$ impregnation, percent | Mohs hardness | Rockwell hardness | Cracks | Remarks |
|---|---|---|---|---|---|---|---|---|
| Y-2 | $ZrO_2$ | $ZrOCl_2$ | 1× | 85 | 5-6 | A-55.5 | None | |
| Y-4 | $ZrO_2$ | $ZrOCl_2$ | 2× | 85 | 9-10 | A-63.5 | do | |
| K-5 | $ZrO_2$ | $ZrOCl_2$ | 3× | 85 | 9-10 | A-61.7 | do | |
| Y-5 | $ZrO_2$ | $ZrOCl_2$ | 4× | 85 | 9-10 | A-71.6 | do | |

Tables XIX and XX show the effect on hardness for 1 through 5 impregnations of zirconium oxide into base materials of AP-94-12 and AHP-99 alumina respectively. Again, the AP-94 material produces greater hardness than the AHP-99 for comparable impregnations. Also, while the AP-94 material impregnated with zirconium oxide does not produce as hard an end product as does the chromic oxide impregnation, the reverse is true when considering the AHP-99 material. Again, the explanation is undoubtedly connected with differences in pore size and/or impurities in the base material.

Tables XXI and XXII show similar tests to those just described except that the impregnant was magnesium chromate instead of zirconyl chloride.

TABLE XXI.—HARDNESS VARIATION WITH NUMBER OF MAGNESIUM CHROMITE IMPREGNATIONS USING COORS AP-94-12 ALUMINA REFRACTORY BASE MATERIAL

| Sample No. | Oxide formed | Salt impregnation | No. salt impreg. | $H_3PO_4$ impregnation, percent | Mohs hardness | Rockwell hardness | Cracks | Remarks |
|---|---|---|---|---|---|---|---|---|
| M-1 | $MgCr_2O_4$ | $MgCrO_4$ | 1X | 85 | 9-10 | A-66 | None | |
| M-2 | $MgCr_2O_4$ | $MgCrO_4$ | 3X | 85 | 9-10 | A-72 | ...do.... | |
| M-3 | $MgCr_2O_4$ | $MgCrO_4$ | 5X | 85 | 9-10 | A-70 | ...do.... | |

TABLE XXII.—HARDNESS VARIATION WITH NUMBER OF MAGNESIUM CHROMITE IMPREGNATIONS USING COORS AFP-99 ALUMINA REFRACTORY BASE MATERIAL

| Sample No. | Oxide formed | Salt impregnation | No. salt impreg. | $H_3PO_4$ impregnation, percent | Mohs hardness | Rockwell hardness | Cracks | Remarks |
|---|---|---|---|---|---|---|---|---|
| M-4 | $MgCr_2O_4$ | $MgCrO_4$ | 1X | 85 | 6-7 | A-50 | None | |
| M-5 | $MgCr_2O_4$ | $MgCrO_4$ | 3X | 85 | 9-10 | A-53 | ...do.... | |
| M-6 | $MgCr_2O_4$ | $MgCrO_4$ | 5X | 85 | 9-10 | A-61 | ...do.... | |

Tables XXIII and XXIV are for ceric oxide impregnated AP-94-11 and AHP-99 base material, respectively. Table XXV covers the AP-94 with cobalt nitrate used as the impregnant. Table XXVI is for the same base material but using a concentrated silico-tungstic acid solution for the impregnant. Table XXVII is again for the AP-94 base material but using a 1:1 mixture of ferric chloride and chromic acid as the impregnating solution to form a ferric chromite when cured.

TABLE XXIII.—HARDNESS VARIATIONS WITH NUMBER OF CERIC OXIDE IMPREGNATIONS USING COORS AP-94-11 ALUMINA REFRACTORY BASE MATERIAL

| Sample No. | Oxide formed | Salt impregnation | No. salt impreg. | $H_3PO_4$ impregnation, percent | Mohs hardness | Rockwell hardness | Cracks | Remarks |
|---|---|---|---|---|---|---|---|---|
| C-0 | $CeO_2$ | $Ce(NO_3)_2$ | 2X | 85 | 8-9 | A-68.3 | None | |
| C-1 | $CeO_2$ | $Ce(NO_3)_2$ | 3X | 85 | 9-10 | A-71.1 | do | |
| C-2 | $CeO_2$ | $Ce(NO_3)_2$ | 4X | 85 | 9-10 | A-72.9 | do | |
| C-3 | $CeO_2$ | $Ce(NO_3)_2$ | 5X | 85 | 9-10 | A-74.6 | do | |
| C-4 | $CeO_2$ | $Ce(NO_3)_2$ | 6X | 85 | 9-10 | A-75.7 | do | |

TABLE XXIV.—HARDNESS VARIATIONS WITH NUMBER OF CERIC OXIDE IMPREGNATIONS USING COORS AHP-99 ALUMINA REFRACTORY BASE MATERIAL

| Sample No. | Oxide formed | Salt impregnation | No. salt impreg. | $H_3PO_4$ impregnation, percent | Mohs hardness | Rockwell hardness | Cracks | Remarks |
|---|---|---|---|---|---|---|---|---|
| C-5 | $CeO_2$ | $Ce(NO_3)_2$ | 3X | 85 | 8-9 | A-54.9 | None | |
| C-6 | $CeO_2$ | $Ce(NO_3)_2$ | 4X | 85 | 8-9 | A-59.4 | do | |
| C-7 | $CeO_2$ | $Ce(NO_3)_2$ | 5X | 85 | 8-9 | A-59.0 | do | |
| C-8 | $CeO_2$ | $Ce(NO_3)_2$ | 6X | 85 | 8-9 | A-60.1 | do | |

TABLE XXV.—HARDNESS VARIATION WITH NUMBER OF COBALT OXIDE IMPREGNATIONS USING COORS AP-94-12 ALUMINA REFRACTORY BASE MATERIAL

| Sample No. | Oxide formed | Salt impregnation | No. salt impreg. | $H_3PO_4$ impregnation, percent | Mohs hardness | Rockwell hardness | Cracks | Remarks |
|---|---|---|---|---|---|---|---|---|
| 3-B | CoO | $Co(NO_3)_2$ | 1X 2X | 85 | 9-10 | A-71.5 | None | |
| 4-B | CoO | $Co(NO_3)_2$ | 3X 4X | 85 | 9-10 | A-73.0 | None | |
| 1-T | CoO | $Co(NO_3)_2$ | 5X | 85 | 9-10 | A-74.5 | None | |

TABLE XXVI.—HARDNESS VARIATION WITH NUMBER OF TUNGSTIC OXIDE IMPREGNATIONS USING COORS AP-94-12 ALUMINA REFRACTORY BASE MATERIAL

| Sample number | Oxide formed | Salt impreg. | No. salt impreg. | $H_3PO_4$ impregnation, percent | Mohs hardness | Rockwell hardness | Cracks | Remarks |
|---|---|---|---|---|---|---|---|---|
| 1-W | $WO_3$ | $H_4SiW_{16}O_{40}$ | 1X | 85 | 8-9 | A-69.0 | None | |
| 2-W | $WO_3$ | $H_4SiW_{16}O_{40}$ | 3X | 85 | 7-8 | A-71.0 | ...do..... | |
| 5-W | $WO_3$ | $H_4SiW_{16}O_{40}$ | 4X | 85 | 9-10 | A-76.0 | ...do..... | |
| 3-W | $WO_3$ | $H_4SiW_{16}O_{40}$ | 5X | 85 | 9-10 | A-76.0 | ...do..... | |
| 7-W | $WO_3$ | $H_4SiW_{16}O_{40}$ | 6X | 85 | | | | |
| 8-W | $WO_3$ | $H_4SiW_{16}O_{40}$ | 7X | 85 | 9-10 | A-75.0 | None | |

TABLE XXVII.—HARDNESS VARIATION WITH NUMBER OF FERRIC CHROMITE IMPREGNATIONS USING COORS AP-94-12 ALUMINA REFRACTORY BASE MATERIAL

| Sample number | Oxide formed | Salt impregnation | No. salt impreg. | $H_3PO_4$ impregnation, percent | Mohs hardness | Rockwell hardness | Cracks | Remarks |
|---|---|---|---|---|---|---|---|---|
| 4-A | $FeO_2Cr_2O_3$ | (1)$FeCl_3$ + (1)$CrO_3$ | 1X | 85 | 6-7 | A-72 | None | |
| | | | 2X | | | | | |
| 1-A | $Fe_2O_3Cr_2O_3$ | (1)$FeCl_3$ + (1)$CrO_3$ | 3X | 85 | 9-10 | A-75 | None | |
| 2-A | $Fe_2O_3Cr_2O_3$ | (1)$FeCl_3$ + (1)$CrO_3$ | 4X | 85 | 9-10 | A-77 | ...do | |
| 3-A | $Fe_2O_3Cr_2O_3$ | (1)$FeCl_3$ + (1)$CrO_3$ | 5X | 85 | 9-10 | A-82 | ...do | |

A zirconia base material has been used for tests shown as Tables XXVIII and XXIX. These are for a coarse grain, calcia stabilized, 95% zirconia underfired refractory material with chromic oxide and zirconium oxide impregnations as shown.

A series of multiple phosphoric acid treatments of the Coors AP-94, AHP-99 and AP-85 alumina base material has been investigated. The results are shown in Tables XXX, XXXI and XXXII. For the most part, these tests show that one phosphoric acid treatment is equal to, or better than, more than one treatment.

TABLE XXVIII.—HARDNESS VARIATION WITH NUMBER OF CHROMIC OXIDE IMPREGNATIONS USING DU-CO, CALCIA STABILIZED, 95% ZIRCONIA BASE MATERIAL

| Sample number | Oxide formed | Salt impregnation | No. salt impreg. | $H_3PO_4$ impregnation, percent | Mohs hardness | Rockwell hardness | Cracks | Remarks |
|---|---|---|---|---|---|---|---|---|
| 20-Z | $Cr_2O_3$ | $CrO_3$ | 3X | 85 | 6-7 | A-69.5 | None | |
| 21-Z | $Cr_2O_3$ | $CrO_3$ | 5X | 85 | 6-7 | A-78.5 | ...do | |
| 22-Z | $Cr_2O_3$ | $CrO_3$ | 7X | 85 | 6-7 | A-77 | ...do | |
| 23-Z | None | None | None | 85 | 8-9 | A-54 | ...do | |

TABLE XXIX.—HARDNESS VARIATION WITH NUMBER OF ZIRCONIUM OXIDE IMPREGNATIONS USING DU-CO, CALCIA STABILIZED, 95% ZIRCONIA BASE MATERIAL

| Sample number | Oxide formed | Salt impregnation | No. salt impreg. | $H_3PO_4$ impregnation, percent | Mohs hardness | Rockwell hardness | Cracks | Remarks |
|---|---|---|---|---|---|---|---|---|
| 23-Z | $ZrO_2$ | $ZrOCl_2$ | 3X | 85 | 6-7 | A-65 | None | |
| 24-Z | $ZrO_2$ | $ZrOCl_2$ | 5X | 85 | 6-7 | A-66 | ...do | |
| 25-Z | $ZrO_2$ | $ZrOCl_2$ | 7X | 85 | 6-7 | Fractured | | |
| 26-Z | None | None | None | 85 | 8-9 | A-54 | None | |

TABLE XXX.—MULTIPLE ACID IMPREGNATIONS USING COORS AP-94-12 ALUMINA REFRACTORY BASE MATERIAL

| Sample number | Salt impregnation | Number salt impregnation | $H_3PO_4$ impregnation, percent | Number acid impregnation | Mohs hardness | Rockwell hardness | Cracks | Remarks |
|---|---|---|---|---|---|---|---|---|
| P-1 | None | | 85 | 1X | 8-9 | A-68.7 | None | |
| P-2 | do | | 85 | 2X | 8-9 | A-67.8 | ...do | |
| P-3 | do | | 85 | 3X | 6-7 | A-67.7 | ...do | |
| P-4 | do | | 42½ | 1X | 4-5 | A-64.8 | Yes | Fractured. |
| P-5 | do | | 42½ | 2X | 6-7 | A-58.7 | Yes | Do. |
| P-6 | do | | 42½ | 3X | 6-7 | A-58.5 | None | Do. |

TABLE XXXI.—MULTIPLE ACID IMPREGNATIONS USING COORS AP-85-11 ALUMINA REFRACTORY BASE MATERIAL

| Sample number | Salt impregnation | Number salt impregnation | $H_3PO_4$ impregnation, percent | Number acid impregnation | Mohs hardness | Rockwell hardness | Cracks | Remarks |
|---|---|---|---|---|---|---|---|---|
| P-7 | None | | 85 | 1X | 8-9 | A-61.2 | Yes | |
| P-8 | do | | 85 | 2X | 9-10 | A-58.5 | Yes | Fractured. |
| P-9 | do | | 85 | 3X | 6-7 | A-63.0 | None | |
| P-10 | do | | 42½ | 1X | 4-5 | A-53.7 | do | |
| P-11 | do | | 42½ | 2X | 6-7 | Fractured | Yes | Fractured. |
| P-12 | do | | 42½ | 3X | 6-7 | A-67.6 | Yes | |

TABLE XXXII.—MULTIPLE ACID IMPREGNATIONS USING COORS AHP-99 ALUMINA REFRACTORY BASE MATERIAL

| Sample number | Salt impregnation | Number salt impregnation | $H_3PO_4$ impregnation, percent | Number acid impregnation | Mohs hardness | Rockwell hardness | Cracks | Remarks |
|---|---|---|---|---|---|---|---|---|
| P-13 | None | | 85 | 1X | 5-6 | A-44.2 | Yes | |
| P-14 | do | | 85 | 2X | 6-7 | A-45.0 | Yes | Fractured. |
| P-15 | do | | 85 | 3X | 6-7 | A-68.0 | None | |
| 1-R | do | | 85 | 3X | N.M. | N.M. | Yes | |
| 2-R | do | | 85 | 4X | N.M. | N.M. | Yes | |
| 3-R | do | | 85 | 5X | N.M. | N.M. | Yes | |
| 4-R | do | | 85 | 6X | N.M. | N.M. | Yes | |
| P-16 | do | | 42½ | 1X | 4-5 | A-31.7 | None | |
| P-17 | do | | 42½ | 2X | 6-7 | Fractured | Yes | Fractured. |
| P-18 | do | | 42½ | 3X | 6-7 | A-41.3 | None | |

Table XXXIII shows the same type of multiple acid treatment test, except that the Coors (AP-94) material has been first impregnated with three chromic acid applications prior to the final acid treatments. Again, one acid treatment appears to be optimum.

now been found that this marked increase in hardness occurs with at least two single oxides; chromic oxide and cobalt oxide, and at least two complex oxides; magnesium chromite and iron chromite, when used as impregnants for one or more of the porous alumina base materials. A TABLE XXXIII.—MULTIPLE ACID IMPREGNATION TEST USING COORS AP-94-12 ALUMINA REFRACTORY BASE MATERIAL WITH CHROMIC OXIDE PRE-TREATMENT

| Sample number | Salt impregnation | Number salt impregnation | $H_3PO_4$ impregnation, percent | Number acid impregnation | Mohs hardness | Rockwell hardness | Cracks | Remarks |
|---|---|---|---|---|---|---|---|---|
| 1-C | $CrO_3$ | 3× | 85 | 1× | 9-10 | A-82.5 | None | |
| 2-C | $CrO_3$ | 3× | 85 | 2× | 9-10 | A-81.0 | ---do--- | |
| 3-C | $CrO_3$ | 3× | 42½ | 1× | 9-10 | A-78.1 | ---do--- | |
| 4-C | $CrO_3$ | 3× | 42½ | 2× | 9-10 | A-81.0 | ---do--- | |
| 5-C | $CrO_3$ | 3× | 42½ | 3× | 9-10 | A-81.0 | ---do--- | |

Tables XXXIV and XXXV show the effect of varying the phosphoric acid concentration. In the previous tests, the acid strength has been either 85% or 42½% $H_3PO_4$. In these two tests 95%, 90% and 75% phosphoric acid are also compared with the standard 85% strength treatment. Table XXXIV covers the AP-94 base material and Table XXXV the AHP-99 material.

fifth impregnant, silico-tungsten acid, has also been found to react in a similar manner.

Tables XXXVI and XXXVII respectively show the hardness measurements obtained with AP-94-II and AHP-99 alumina base materials with multiple chromic oxide impregnations only (no final acid treatment). Table XXXVIII covers the same two base refractory materials TABLE XXXIV.—EFFECT ON HARDNESS OF VARYING ACID CONCENTRATION USING COORS AP-94-12 ALUMINA REFRACTORY BASE MATERIAL

| Sample number | Salt impregnation | Number salt impregnation | $H_3PO_4$ impregnation, percent | Number acid impregnation | Mohs hardness | Rockwell hardness | Cracks | Remarks |
|---|---|---|---|---|---|---|---|---|
| 21-E | None | | 95 | 1× | 5-6 | A-63.0 | None | |
| 23-E | do | | 85 | 1× | 6-7 | A-65.0 | ---do--- | |
| 25-E | do | | 75 | 1× | 6-7 | A-59.5 | ---do--- | |
| P-4 | do | | 42½ | 1× | 4-5 | A-64.8 | ---do--- | |
| 27-E | $CrO_3$ | 3× | 95 | 1× | 9-10 | A-83.0 | ---do--- | |
| 29-E | $CrO_3$ | 3× | 85 | 1× | 9-10 | A-80.5 | ---do--- | |
| 31-E | $CrO_3$ | 3× | 75 | 1× | 8-9 | A-82.0 | ---do--- | |
| 3-C | $CrO_3$ | 3× | 42½ | 1× | 9-10 | A-81.0 | ---do--- | |
| L-4 | $CrO_3$ | 3× | 85 | 1× | 9-10 | A-81.5 | ---do--- | |

TABLE XXXV.—EFFECT ON HARDNESS OF VARYING ACID CONCENTRATION USING COORS AHP-99 ALUMINA REFRACTORY BASE MATERIAL

| Sample number | Salt impregnation | Number salt impregnation | $H_3PO_4$ impregnation, percent | Number acid impregnation | Mohs hardness | Rockwell hardness | Cracks | Remarks |
|---|---|---|---|---|---|---|---|---|
| 20-E | None | | 95 | 1× | 4-5 | A46.0 | None | |
| 22-E | do | | 95 | 1× | 6-7 | A-56.0 | ---do--- | |
| 4-E | do | | 75 | 1× | 6-7 | A-46.0 | ---do--- | |
| P-16 | do | | 41½ | 1× | 4-5 | A-31.7 | ---do--- | |
| 26-E | $CrO_3$ | 3× | 95 | 1× | 5-6 | A-70.0 | ---do--- | |
| 28-E | $CrO_3$ | 3× | 85 | 1× | 4-5 | A-74.0 | ---do--- | |
| 30-E | $CrO_3$ | 3× | 75 | 1× | 4-5 | A-71.5 | ---do--- | |

When conducting impregnation tests with various metal oxides, it was found that a marked increase in the Mohs hardness scratch number occurred in several instances even before the final phosphoric acid treatment. It has with multiple magnesium chromite impregnations only and Table XXXIX shows the same Coors AP-94-II alumina material, but using multiple ferric chromite impregnations. Table XXXIX-A shows the Coors AP-94-12 material with multiple tungstic oxide impregnations.

TABLE XXXVI.—HARDNESS MEASUREMENTS FOR MULTIPLE $Cr_2O_3$ IMPREGNATIONS WITHOUT FINAL ACID TREATMENT USING COORS AP-94-12 ALUMINA REFRACTORY BASE MATERIAL

| Sample number | Base material | Salt impregnation | No. salt impreg. | $H_3PO_4$ impregnation | Mohs hardness | Rockwell hardness | Cracks | Remarks |
|---|---|---|---|---|---|---|---|---|
| O-1 | AP-94-12 | $CrO_3$ | 1× | None | 4-5 | A-43.0 | None | |
| O-2 | AP-94-12 | $CrO_3$ | 2× | ---do--- | 4-5 | A-62.2 | ---do--- | |
| O-3 | AP-94-12 | $CrO_3$ | 3× | ---do--- | 8-9 | A-74.0 | ---do--- | |
| O-4 | AP-94-12 | $CrO_3$ | 4× | ---do--- | 9-10 | A-82.0 | ---do--- | |
| O-5 | AP-94-12 | $CrO_3$ | 5× | ---do--- | 9-10 | A-84.0 | ---do--- | |
| 3-S | AP-94-12 | $CrO_3$ | 7× | ---do--- | 9-10 | A-84.0 | ---do--- | |
| 4-S | AP-94-12 | $CrO_3$ | 9× | ---do--- | 9-10 | A-84.5 | ---do--- | |
| 5-S | AP-94-12 | $CrO_3$ | 11× | ---do--- | 9-10 | A-86.0 | ---do--- | |

TABLE XXXVII.—HARDNESS MEASUREMENTS FOR MULTIPLE $Cr_2O_3$ IMPREGNATIONS WITHOUT FINAL ACID TREATMENT USING COORS AHP-99 ALUMINA REFRACTORY BASE MATERIAL

| Sample number | Base material | Salt impregnation | No. salt impreg. | $H_3PO_4$ impregnation | Mohs hardness | Rockwell hardness | Cracks | Remarks |
|---|---|---|---|---|---|---|---|---|
| O-6 | AHP-99 | $CrO_3$ | 1× | None | 3-4 | A-15.2 | None | |
| O-7 | AHP-99 | $CrO_3$ | 3× | ---do--- | 6-7 | A-54.7 | ---do--- | |
| O-8 | AHP-99 | $CrO_3$ | 5× | ---do--- | 8-9 | A-69.0 | ---do--- | |
| 3-U | AHP-99 | $CrO_3$ | 7× | ---do--- | 9-10 | A-75.0 | ---do--- | |
| 4-U | AHP-99 | $CrO_3$ | 9× | ---do--- | 9-10 | A-78.0 | ---do--- | |
| 5-U | AHP-99 | $CrO_3$ | 11× | ---do--- | 9-10 | A-79.5 | ---do--- | |

TABLE XXXVIII.—HARDNESS MEASUREMENTS FOR MULTIPLE MAGNESIUM CHROMITE IMPREGNATIONS WITHOUT FINAL ACID TREATMENT

| Sample number | Base material | Salt impregnation | No salt impregnation | $H_3PO_4$ impregnation | Mohs Hardness | Rockwell hardness | Cracks | Remarks |
|---|---|---|---|---|---|---|---|---|
| M-1 | AP-94-12 | $MgCrO_4$ | 1× | None | 4-5 | A-24.7 | None | |
| M-2 | AP-94-12 | $MgCrO_4$ | 3× | do | 8-9 | A-49.2 | do | |
| M-3 | AP-94-12 | $MgCrO_4$ | 5× | do | 9-10 | A-63.1 | do | |
| M-4 | AHP-99 | $MgCrO_4$ | 1× | do | 3-4 | A-8.7 | do | |
| M-5 | AHP-99 | $MgCrO_4$ | 3× | do | 6-7 | A-28.8 | do | |
| M-6 | AHP-99 | $MgCrO_4$ | 5× | do | 8-9 | A-39.0 | do | |

TABLE XXXIX.—HARDNESS MEASUREMENTS FOR MULTIPLE IMPREGNATIONS WITHOUT FINAL ACID TREATMENT USING COORS AP-94-11 ALUMINA REFRACTORY BASE MATERIAL

| Sample number | Oxide formed | Salt impregnation | No salt impregnation | $H_3PO_4$ impregnation | Mohs hardness | Rockwell hardness | Cracks | Remarks |
|---|---|---|---|---|---|---|---|---|
| 4-A | $Fe_2O_3Cr_2O_3$ | $(1)FeCl_3+(1)CrO_3$ | 1× | None | 4-5 | | | |
| 5-A | $FeO_3Cr_2O_3$ | $(1)FeCl_3+(1)CrO_3$ | 3× | do | 9-10 | | | |
| 6-A | $Fe_2O_3Cr_2O_3$ | $(1)FeCl_3+(1)CrO_3$ | 5× | do | 9-10 | | | |

TABLE XXXIX-A.—HARDNESS MEASUREMENTS FOR MULTIPLE TUNGSTIC OXIDE IMPREGNATIONS WITHOUT FINAL ACID TREATMENT USING COORS AP-94-12 ALUMINA REFRACTORY BASE MATERIAL

| Sample No. | Base material | Salt impregnation | No. salt impreg. | $H_3PO_4$ impregnation | Mohs hardness | Rockwell hardness | Cracks | Remarks |
|---|---|---|---|---|---|---|---|---|
| 1-W | AP-94-12 | $H_4SiW_{16}O_{40}$ | 1× | None | 4-5 | A-35.0 | None | |
| 2-W | AP-94-12 | $H_4SiW_{16}O_{40}$ | 3× | do | 7-8 | Fractured | do | |
| 5-W | AP-94-12 | $H_4SiW_{16}O_{40}$ | 4× | do | 8-9 | A-75.0 | do | |
| 3-W | AP-94-12 | $H_4SiW_{16}O_{40}$ | 5× | do | 8-9 | A-69.5 | do | |
| 7-W | AP-94-12 | $H_4SiW_{16}O_{40}$ | 6× | do | 9-10 | A-65.0 | do | |
| 8-W | AP-94-12 | $H_4SiW_{16}O_{40}$ | 7× | do | 9-10 | A-74.0 | do | |

Compressive strength tests have been conducted for several treated refractory ceramics using the ASTM tentative standard, Method C528–637.

The data presented in Tables XL, XLI, XLII, and XLIII cover Coors AP–94–11, AP–94–12, AP–85–11, and AP–99–L3 alumina refractory base material, respectively, with a single acid treatment only.

TABLE XL.—COMPRESSIVE STRENGTH MEASUREMENTS FOR COORS AP-94-11 ALUMINA REFRACTORY BASE MATERIAL USING SINGLE ACID TREATMENT ONLY

| | Salt impregnation | No. salt impreg. | $H_3PO_4$ impregnation, percent | Sample diameter | Area (in.²) | Lbf. | Compressive strength, p.s.i. | Remarks |
|---|---|---|---|---|---|---|---|---|
| Sample number: | | | | | | | | |
| 1 | None | | | 85 | .622 | .303 | 22.7K | 74,800 |
| 2 | do | | | 85 | .623 | .304 | 23.2K | 76,500 |
| 3 | do | | | 85 | .625 | .306 | 24.2K | 82,200 |
| 4 | do | | | 85 | .622 | .303 | 16.2K | 53,500 |
| 5 | do | | | 85 | .622 | .303 | 22.4K | 74,000 |
| Avg | | | | | | | | 72,500 |

TABLE XLI.—COMPRESSIVE STRENGTH MEASUREMENTS FOR COORS AP-94-12 ALUMINA REFRACTORY BASE MATERIAL USING SINGLE ACID TREATMENT ONLY

| | Salt impregnation | No. salt impreg. | $H_3PO_4$ impregnation, percent | Sample diameter | Area (in.²) | Lbf. | Compressive strength, p.s.i. | Remarks |
|---|---|---|---|---|---|---|---|---|
| Sample number: | | | | | | | | |
| 1 | None | | | 85 | .622 | .303 | 26.3K | 87,000 |
| 2 | do | | | 85 | .623 | .304 | 21.8K | 71,800 |
| 3 | do | | | 85 | .625 | .306 | 25.7K | 83,800 |
| 4 | do | | | 85 | .621 | .302 | 29.0K | 94,000 |
| 4 | do | | | 85 | .624 | .305 | 22.0K | 72,300 |
| Avg | | | | | | | | 81,800 |

TABLE XLII.—COMPRESSIVE STRENGTH MEASUREMENTS FOR COORS AP-85-11 ALUMINA REFRACTORY BASE MATERIAL USING SINGLE ACID TREATMENT ONLY

| | Salt impregnation | Number salt impregnation | $H_3PO_4$ impregnation, percent | Sample diameter | Area (in.²) | Lbf. | Compressive strength, p.s.i. | Remarks |
|---|---|---|---|---|---|---|---|---|
| Sample number: | | | | | | | | |
| 1 | None | | | 85 | .625 | .306 | 17.8K | 58,300 |
| 2 | do | | | 85 | .625 | .306 | 20.0K | 65,500 |
| 3 | do | | | 85 | .625 | .306 | 12.6K | 41,000 |
| 4 | do | | | 85 | .624 | .305 | 12.7K | 41,600 |
| 5 | do | | | 85 | .623 | .304 | 18.95K | 62,300 |
| Avg | | | | | | | | 53,740 |

TABLE XLIII.—COMPRESSIVE STRENGTH MEASUREMENTS FOR COORS AP–99–L3 ALUMINA REFRACTORY BASE MATERIAL USING SINGLE ACID TREATMENT ONLY

| | Salt impregnation | No. salt impreg. | $H_3PO_4$ impregnation, percent | Sample diameter | Area (in.²) | Lbf. | Compressive strength, p.s.i. | Remarks |
|---|---|---|---|---|---|---|---|---|
| Sample number: | | | | | | | | |
| 1 | None | | 85 | .625 | .306 | 23.6K | 77,400 | |
| 2 | do | | 85 | .624 | .305 | 21.7K | 71,000 | |
| 3 | do | | 85 | .625 | .305 | 21.6K | 70,900 | |
| Avg | | | | | | | 73,100 | |

Tables XLIV, XLV and XLVI cover Coors AHP-99 base material with three impregnations of chromic oxide, magnesium chromite and zirconium oxide, respectively. A final, single acid treatment was also used in each case.

Modulus of Rupture tests have been conducted using the procedure of ASTM Method C369–56 with the exception that the sample size has been reduced. The ASTM Method calls for samples ¾" in diameter x 6" in length. The TABLE XLIV.—COMPRESSIVE STRENGTH MEASUREMENTS FOR COORS AHP-99 ALUMINA REFRACTORY BASE MATERIAL USING CHROMIC OXIDE IMPREGNATIONS PLUS SINGLE ACID TREATMENT

| | Salt impregnation | No. salt impreg. | $H_3PO_4$ impregnation, percent | Sample diameter | Area (in.²) | Lbf. | Compressive strength, p.s.i. | Remarks |
|---|---|---|---|---|---|---|---|---|
| Sample number: | | | | | | | | |
| N-7 | CrO₃ | 3X | 85 | .249 | .049 | 3,900 | 78,100 | |
| N-8 | CrO₃ | 3X | 85 | .250 | .049 | 4,475 | 89,600 | |
| C-1 | CrO₃ | 3X | 85 | .249 | .049 | 4,150 | 85,215 | |
| C-2 | CrO₃ | 3X | 85 | .250 | .049 | 3,750 | 76,375 | |
| C-3 | CrO₃ | 3X | 85 | .250 | .049 | 3,050 | 62,370 | |
| C-4 | CrO₃ | 3X | 85 | .249 | .049 | 4,375 | 89,835 | |
| Avg | | | | | | | 80,249 | |

TABLE XLV.—COMPRESSIVE STRENGTH MEASUREMENTS FOR COORS AHP-99 ALUMINA REFRACTORY BASE MATERIAL USING MAGNESIUM CHROMITE IMPREGNATIONS PLUS SINGLE ACID TREATMENT

| | Salt impregnation | No. salt impreg. | $H_3PO_4$ impregnation, percent | Sample diameter | Area (in.²) | Lbf. | Compressive strength, p.s.i. | Remarks |
|---|---|---|---|---|---|---|---|---|
| Sample number: | | | | | | | | |
| N-2 | MgCrO₄ | 3X | 85 | .250 | .0492 | 4,175 | 83,600 | |
| N-3 | MgCrO₄ | 3X | 85 | .250 | .0492 | 3,575 | 71,500 | |
| Avg | | | | | | | 77,550 | |

TABLE XLVI.—COMPRESSIVE STRENGTH MEASUREMENTS FOR COORS AHP-99 ALUMINA REFRACTORY BASE MATERIAL USING ZIRCONIUM OXIDE IMPREGNATIONS PLUS SINGLE ACID TREATMENT

| | Salt impregnation | No. salt impreg. | $H_3PO_4$ impregnation, percent | Sample diameter | Area (in.²) | Lbf. | Compressive strength, p.s.i. | Remarks |
|---|---|---|---|---|---|---|---|---|
| Sample number: | | | | | | | | |
| N-5 | ZrOCl₂ | 3X | 85 | .249 | .049 | 2,375 | 47,500 | |
| N-6 | ZrOCl₂ | 3X | 85 | .250 | .049 | 1,800 | 36,050 | |
| Avg | | | | | | | 41,775 | |

Table XLVII shows compressive strength measurements for Coors AP-94-11 material with three chromic oxide impregnations, plus final acid treatment.

present ceramic samples have been prepared with dimensions on the order of ¼" in diameter x 2" in length. The sample size change was made because of the lack of curing ovens long enough to conveniently handle the 6" piece.

TABLE XLVII.—COMPRESSIVE STRENGTH MEASUREMENTS FOR COORS AP-94-11 ALUMINA REFRACTORY BASE MATERIAL USING CHROMIC OXIDE IMPREGNATIONS

| | Salt impregnation | No. salt impreg. | $H_3PO_4$ impregnation, percent | Sample diameter | Area (in.²) | Lbf. | Compressive strength, p.s.i. | Remarks |
|---|---|---|---|---|---|---|---|---|
| Sample number: | | | | | | | | |
| C-5 | CrO₃ | 3X | 85 | .251 | .049 | 6,100 | 123,730 | |
| C-6 | CrO₃ | 3X | 85 | .251 | .049 | 6,600 | 133,333 | |
| Avg | | | | | | | 128,532 | |

Table XLVIII lists the modulus of rupture test results for the Coors AP-94-12 base material with multiple (zero, three and six) chromic oxide impregnations and Table XLVIII-A lists the modulus of rupture tests for the Coors AP-99-L3 base material with multiple (three and six) chromic oxide impregnations and with chromic acid plus other oxide impregnations.

TABLE XLVIII.—MODULUS OF RUPTURE TEST DATA FOR COORS AP-94-12 (ISOSTATIC) ALUMINA REFRACTORY BASE MATERIAL

| Sample number | Salt impregnations | No. salt impreg. | $H_3PO_4$ impregnation, percent | Diameter | Support distance | Lbf. | Modulus of rupture | Remarks |
|---|---|---|---|---|---|---|---|---|
| 1-R | None | | 85 | 0.295 | | 68 | 10,200 | |
| 2-R | do | | 85 | 0.295 | | 68 | 10,200 | |
| 3-R | $CrO_3$ | 3X | 85 | 0.293 | | 92 | 14,000 | |
| 4-R | $CrO_3$ | 3X | 85 | 0.292 | | 65 | 10,000 | |
| 5-R | $CrO_3$ | 6X | 85 | 0.254 | | 76 | 11,480 | |

TABLE XLVIII-A.—MODULUS OF RUPTURE TEST DATA FOR COORS AP-99-L3 ALUMINA REFRACTORY BASE MATERIAL

| Sample number | Salt impregnations | No. salt impreg. | $H_3PO_4$ impregnation, percent | Diameter | Support distance in. | Lbf₂ | Modulus of rupture | Remarks |
|---|---|---|---|---|---|---|---|---|
| 7 | None | | 85 | .260 | 1.50 | 82 | 17,900 | |
| 9 | $CrO_3$ | 3X | 85 | .258 | 1.50 | 125 | 27,900 | |
| 10 | $CrO_3$ | 3X | 85 | .258 | 1.50 | 110 | 24,500 | |
| 11 | $CrO_3$ | 6X | 85 | .258 | 1.50 | 84 | 18,700 | |
| 12 | $CrO_3$ | 6X | 85 | .260 | 1.50 | 164 | 35,700 | |
| 13 | $CrO_3$ + $ZrOCl_2$ | 4X/2X | 85 | .258 | 1.50 | 148 | 33,000 | |
| 14 | $CrO_3$ + $ZrOCl_2$ | 4X/2X | 85 | .257 | 1.50 | 128 | 28,900 | |
| 15 | $CrO_3$ + $Ni(NO_3)_2$ | 4X/2X | 85 | .260 | 1.50 | 110 | 24,000 | |
| 16 | $CrO_3$ + $Ni(NO_3)_2$ | 4X/2X | 85 | .258 | 1.50 | 124 | 27,600 | |
| 17 | $CrO_3$ + $H_4SiW_{16}O_{40}$ | 4X/2X | 85 | .258 | 1.50 | 105 | 23,400 | |
| 19 | $CrO_3$ + $Be(NO_3)_2$ | 4X/2X | 85 | .258 | 1.50 | 80 | 17,800 | |

Specific gravity determinations for a number of the porous refractory base materials, measured in the received condition, is presented in Table XLIX.

TABLE XLIX.—SPECIFIC GRAVITY DETERMINATION FOR VARIOUS REFRACTORY BASE MATERIALS WITHOUT OXIDE OR ACID TREATMENTS (AS RECEIVED CONDITION)

| Sample number | Base material | Salt impreg. | No. salt impreg. | $H_3PO_4$ impreg. | Volume (cc.) | Wt. in air (dry) (gms.) | Length (cm.) | Diameter (cm.) | Specific gravity |
|---|---|---|---|---|---|---|---|---|---|
| A99 | AHP-99 | None | None | | 1.684 | 3.53 | 1.471 | 1.210 | 2.10 |
| B93 | AP-99-L3 | do | do | | 1.674 | 3.95 | 1.474 | 1.205 | 2.36 |
| C51 | AP-85-11 | do | do | | 1.645 | 3.94 | 1.456 | 1.200 | 2.39 |
| D41 | AP-94-11 | do | do | | 1.678 | 4.15 | 1.478 | 1.205 | 2.47 |
| E42 | AP-94-12 | do | do | | 1.696 | 4.21 | 1.494 | 1.205 | 2.48 |
| E421 | AP-94-12 (Isostatic) | do | do | | 1.678 | 3.60 | 1.478 | 1.204 | 2.14 |

Specific gravity measurements for some of these same materials, but processed with a single phosphoric acid treatment, is listed in Table L.

TABLE L.—SPECIFIC GRAVITY DETERMINATION FOR VARIOUS REFRACTORY BASE MATERIALS WITH SINGLE ACID TREATMENT ONLY

| Sample number | Base material | Salt impreg. | No. salt impreg. | $H_3PO_4$ impreg. | Volume (cc.) | Wt. in air (dry) (gms.) | Length (cm.) | Diameter (cm.) | Specific gravity |
|---|---|---|---|---|---|---|---|---|---|
| A99 | AHP-99 | None | | 85 | 1.71 | 4.31 | 1.494 | 1.210 | 2.52 |
| A93 | AP-99-L3 | do | | 85 | 1.678 | 4.63 | 1.474 | 1.206 | 2.75 |
| A51 | AP-85-11 | do | | 85 | 1.632 | 4.49 | 1.466 | 1.194 | 2.75 |
| A41 | AP-94-11 | do | | 85 | 1.671 | 4.74 | 1.475 | 1.204 | 2.83 |
| A42 | AP-94-12 | do | | 85 | 1.692 | 4.83 | 1.494 | 1.204 | 2.85 |
| A421 | AP-94-12 (Isostatic) | do | | 85 | 1.675 | 4.32 | 1.478 | 1.203 | 2.58 |

Table LI shows specific gravity measurements for Coors AP-99-L3 alumina base material with 1 through 11 chromic oxide impregnations. This Table shows that a maximum density was obtained with six chromic oxide impregnations.

TABLE LI.—SPECIFIC GRAVITY DETERMINATIONS FOR COORS AP-99-L3 ALUMINA REFRACTORY BASE MATERIAL WITH MULTIPLE CHROMIC OXIDE IMPREGNATIONS

| Sample number | Base material | Salt impreg. | No. salt impreg. | $H_3PO_4$ impreg., percent | Volume (cc.) | Wt. in Air (dry) (gms.) | Length (cm.) | Diameter (cm.) | Specific gravity |
|---|---|---|---|---|---|---|---|---|---|
| 1 | AP-99-L3 | $CrO_3$ | 1X | None | 1.337 | 3.70 | .704 | 1.555 | 2.77 |
| 2 | AP-99-L3 | $CrO_3$ | 3X | 85 | 1.349 | 4.23 | .710 | 1.555 | 3.09 |
| 3 | AP-99-L3 | $CrO_3$ | 5X | 85 | 1.368 | 4.74 | .714 | 1.563 | 3.46 |
| 4 | AP-99-L3 | $CrO_3$ | 7X | 85 | 1.337 | 4.95 | .704 | 1.555 | 3.70 |
| 5 | AP-99-L3 | $CrO_3$ | 9X | 85 | 1.391 | 5.30 | .726 | 1.563 | 3.81 |
| 6 | AP-99-L3 | $CrO_3$ | 11X | 85 | 1.334 | 5.07 | .696 | 1.564 | 3.80 |

To determine the effective porosity of these ceramic materials, water absorption tests were made. The porosity percentage was calculated by determining the weight of the absorbed water in grams divided by the volume of the sample in cubic centimeters. This type of measurement gives the effective porosity only since there may be completely entrapped pores or pores too small to admit water.

Table LII shows the effective porosity measurements made for a number of the porous, underfired refractory base materials prior to any treatment of any kind. These materials show porosity variations ranging from about 30% to about 50% for the types tested.

the final phosphoric acid treatment. In this case, the samples measured approximately 1/8" in the thickness by 3/4" in diameter. Again, no cracking or structural failure occurred after ten cycles in either environment. Moh's hardness measurements also remained unchanged from the pre-test condition.

All the ceramic type materials produced according to the present invention have been repeatedly cycled between ambient temperature and 2000° F. This includes Coors AHP-99, AP-94, AP-85 to AP-99, basic alumina material with $Cr_2O_3$, $MgCr_2O_4$, $ZrO_2$ and many other multiple oxide impregnations, as well as several similar combina- TABLE LII.—EFFECTIVE POROSITY DETERMINATIONS FOR VARIOUS REFRACTORY BASE MATERIALS WITHOUT OXIDE OR ACID TREATMENT (As received condition)

| Sample number | Base material | Salt impregnation | Number | $H_3PO_4$ impregnation | Wt. soaked in $H_2O$ (g.) | Wt. in air (dry) (g.) | $H_2O$ (gm.) absorbed | Volume (cc.) | Effective porosity, percent |
|---|---|---|---|---|---|---|---|---|---|
| A99 | AHP-99 | None | | None | 4.30 | 3.53 | .77 | 1.684 | 45.7 |
| B93 | AP-99-L3 | do | | do | 4.66 | 3.95 | .71 | 1.673 | 42.4 |
| C51 | AP-85-11 | do | | do | 4.49 | 3.94 | .55 | 1.645 | 33.4 |
| D41 | AP-94-11 | do | | do | 4.71 | 4.15 | .56 | 1.678 | 33.5 |
| E42 | AP-94-12 | do | | do | 4.77 | 4.21 | .56 | 1.696 | 33.0 |
| F421 | AP-94-12 [1] | do | | do | 4.34 | 3.60 | .74 | 1.678 | 44.1 |

[1] Isostatic.

Tables LIII shows the same type data as above except that the porous base materials have been given a single phosphoric acid treatment only.

tions with the beryllia, zirconia and magnesia base materials. It has also been found that ceramic parts produced by this invention can be cooled very rapidly after heating TABLE LIII.—EFFECTIVE POROSITY DETERMINATIONS FOR VARIOUS REFRACTORY BASE MATERIALS WITH SINGLE ACID TREATMENT ONLY

| Sample number | Base material | Salt impregnation | Number | $H_3PO_4$ impregnation, percent | Wt. soaked in $H_2O$ (g.) | Wt. in air (dry) (g.) | $H_2O$ (g.) absorbed | Volume (cc.) | Effective porosity, percent |
|---|---|---|---|---|---|---|---|---|---|
| 99 | AHP-99 | None | | 85 | 4.64 | 4.31 | .33 | 1.710 | 19.3 |
| 93 | AP-99-L3 | do | | 85 | 4.87 | 4.62 | .25 | 1.678 | 14.9 |
| 51 | AP-85-II | do | | 85 | 4.70 | 4.49 | .21 | 1.632 | 12.9 |
| 41 | AP-94-II | do | | 85 | 4.95 | 4.74 | .26 | 1.671 | 12.6 |
| 42 | AP-94-12 | do | | 85 | 5.03 | 4.83 | .20 | 1.692 | 11.8 |
| 421 | AP-94-12 [1] | do | | 85 | 4.66 | 4.32 | .28 | 1.675 | 16.7 |

[1] Isostatic.

Table LIV presents data obtained by using 1 through 11 chromic oxide impregnations followed by the single acid treatment. In this test, Coors AP-99-L3 base material was used. As in the case of the specific gravity measurements, minimum porosity occurs at about 9-11 impregnations.

to high temperatures. For example, a thin cross section piece can be removed from a 2000° F. oven and placed directly on an aluminum cooling plate without cracking.

Thin plates of Coors AHP-99 base material with single acid treatment have been exposed continuously to 1000°

TABLE LIV.—EFFECTIVE POROSITY DETERMINATIONS FOR COORS AP-99-L3 ALUMINA REFRACTORY BASE MATERIAL WITH MULTIPLE CHROMIC OXIDE I21 IMPREGNATIONS

| Sample number | Base material | Salt impregnation | Number | $H_3PO_4$ impregnation, percent | Wt. soaked in $H_2O$ (g.) | Wt. in air (dry) (g.) | $H_2O$ (gm.) absorbed | Volume (cc.) | Effective porosity, percent |
|---|---|---|---|---|---|---|---|---|---|
| 1 | AP-99-L3 | $CrO_3$ | 1X | None | 3.95 | 3.70 | .25 | 1.337 | 18.2 |
| 2 | AP-99-L3 | $CrO_3$ | 3X | do | 4.52 | 4.23 | .29 | 1.349 | 21.5 |
| 3 | AP-99-L3 | $CrO_3$ | 5X | do | 4.95 | 4.78 | .21 | 1.368 | 15.3 |
| 4 | AP-99-L3 | $CrO_3$ | 7X | do | 5.10 | 4.95 | .15 | 1.337 | 11.2 |
| 5 | AP-99-L3 | $CrO_3$ | 9X | do | 5.32 | 5.30 | .02 | 1.391 | 1.43 |
| 6 | AP-99-L3 | $CrO_3$ | 11X | do | 5.08 | 5.07 | .01 | 1.334 | 0.74 |

Samples of AHP-99 alumina, with single acid treatment only, have been fabricated in the form of thin discs measuring 1/4" x 3". They were then heated to 1000° F. and water quenched, reheated to 1000° F. and again quenched for a total of ten cycles. No visible signs of cracking or checking were observed.

The same type test has been performed with similarly prepared samples using liquid nitrogen as the quenching media. While liquid nitrogen does not produce as severe a thermal shock as does a good conductor such as water, it does, however, provide a much wider temperature excursion. The samples were left immersed until gas formation ceased and it is estimated that a temperature of about $-300°$ F. had been reached. Again, no cracks or fatiguing were noticed after ten cycles.

These two thermal shock cyclings (1000° F. and liquid nitrogen) were repeated using AP-94-11 alumina base material. These samples were prepared, however, with three, five and seven chromic oxide impregnations prior to F. for 6½ days. No fracturing or cracking could be detected and the pre- and post-exposure hardness measurements were identical.

Additional samples were prepared using Coors AHP-99 and AP-94-12 base material with three magnesium chromite and five chromic oxide impregnations respectively. In each type sample, a final acid treatment was used following the oxide impregnation. These samples were exposed to 1000° F. for 60 hours followed by 8 hours at 2000° F. Again, no structural or hardness changes could be observed.

Sample ceramic parts (approximately 1/8" thick x 3/4" in diameter) using AHP-99 base material with a single acid treatment have also been immersed in liquid nitrogen for 16 hours and then removed and returned to room temperature. No change in hardness was observed and no evidence of cracking or fractures could be found.

Tests have been conducted with machined rods and discs of ceramic materials produced by the instant process to determine what changes occur in dimension between the pre-hardened and the treated and hardened conditions. The accuracy of these measurements is considered to be ±.0001 inches.

Table LV covers AP-99-L3, AP-85-11 and AP-94-12 porous alumina machined pieces before and after a single acid treatment. These parts were cured at a final temperature of 1800° F.

It will be noted that in each X-ray diffraction study of an aluminum oxide ceramic sample which has been subjected to a phosphoric acid treatment according to the present invention, there appears a line which has been labeled X as there is no existing information in the X-ray indexes of a line having been previously observed at this position. As shown in the Table LVII, the untreated AHP- TABLE LV.—DIMENSIONAL CHANGE TESTS FOR HARDENED VS. PRE-HARDENED CERAMIC MATERIAL, MAX. TEMP. 1,800° F., 1 HR.

| Sample number | Base material | Salt impreg. | Number | $H_3PO_4$ impreg., percent | Pre-hardened dimensions | | Hardened dimensions | | Percent change | |
|---|---|---|---|---|---|---|---|---|---|---|
| | | | | | Length | Diameter | Length | Diameter | Length | Diameter |
| E | AP-99-L3 | None | | 85 | 4.957 | 0.3653 | 4.955 | 0.3652 | −0.040 | −0.027 |
| C | AP-94-12 | do | | 85 | 0.7001 | 0.3781 | 0.7001 | 0.3779 | 0 | −0.058 |
| B | AP-94-11 | do | | 85 | 0.9467 | 0.8536 | 0.9457 | 0.8532 | −0.105 | −0.045 |
| D-0 | AHP-99 | $CrO_3$ | 3× | 85 | 0.8521 | 1.0940 | 0.8521 | 1.0940 | 0 | 0 |
| D-4 | AP-94-11 | $CrO_3$ | 3× | 85 | 0.1954 | 0.7560 | 0.1954 | 0.7555 | 0 | −0.066 |
| D-7 | {AP-94-11 / AP-94-12} | {$ZrOU_2$ / $CrO_3$} | 3× / 3× | 85 / 85 | 0.8971 | 0.3040 | 0.8963 | 0.3037 | −0.089 | −0.096 |

Note.—Pre-hardened dimensions were read from the machined base material prior to any chemical treatment. Hardened dimensions were read after chemically treating part and curing to 1,800° F. for 1 hour.

Table LVI shows dimensional change readings for AP-99-L3 and AP-94-12 materials treated with multiple oxide impregnations followed by a final single acid treatment and cured at a final temperature of 1800° F. Percentage values, as above, reflect change in dimension between those of the original machined basic porous structure and those obtained after the part has been chemically treated and hardened. As can be seen, the dimensional changes are exceedingly small.

99 and AP-94 alumina samples A and B do not display the X line, while samples C and D and the others treated with phosphoric acid according to this invention do provide the X line. The X line occurs at a $d$ spacing of approximately 4.12 A. The nearest compound is that of $AlPO_4$, aluminum ortho phosphate having the most intense line with a $d$ spacing of 4.077 angstroms, relative intensity 100 in the 1-1-1 planes; next most intense line $d$ spacing 2.506 angstroms, relative intensity 20, 2-2-0 planes; next most in- TABLE LVI.—DIMENSIONAL CHANGE TESTS FOR HARDENED VS. PRE-HARDENED CERAMIC MATERIAL MAX. TEMP. 2,300° F., 2 HRS.

| Sample number | Base material | Salt impreg. | Number | $H_3PO_4$ impreg., percent | Pre-hardened dimensions | | Hardened dimensions | | Percent change | |
|---|---|---|---|---|---|---|---|---|---|---|
| | | | | | Length | Diameter | Length | Diameter | Length | Diameter |
| D70 | AP-99-L3 | $CrO_3$ | 3× | 85 | 1.9765 | 0.2570 | 1.9765 | 0.2570 | 0 | 0 |
| D71 | AP-99-L3 | $CrO_3$ | 6× | 85 | 1.9760 | 0.2595 | 1.9765 | 0.2595 | +0.025 | 0 |
| D72 | AP-99-L3 | $ZrOCl_2$ | 5× | 85 | 1.9760 | 0.2579 | 1.9765 | 0.2579 | +0.025 | 0 |
| D73 | AP-94-12 (Isostatic) | $CrO_3$ | 3× | 85 | 1.9824 | 0.2590 | 1.9815 | 0.2590 | −0.045 | 0 |
| D74 | AP-94-12 (Isostatic) | $CrO_3$ | 6× | 85 | 1.9916 | 0.2592 | 1.9910 | 0.2592 | −0.030 | 0 |
| D75 | AP-94-12 (Isostatic) | {$CrO_3$ / $ZrOCl_2$} | 4× / 2× | 85 | 1.9805 | 0.2681 | 1.9800 | 0.2681 | −0.025 | 0 |

Note.—Pre-hardened dimensions were read from the machined base material prior to any chemical treatment. Hardened dimensions were read after chemically treating part and curing to 1,800° F.

Various of the treated ceramic materials have been subjected to a number of standard solvents and reagents. Little or no effect has been observed. Immersion tests for treated ceramics utilizing the single acid treatment only and for ceramic types incorporating various oxide impregnations, both with and without the final acid treatment, have been made in acetone, trichlorethylene, hydrochloric acid, sodium hydroxide, sea water, ferric chloride and concentrated sulfuric acid with no observable effect on either the hardness or physical appearance.

X-ray diffraction analysis of the structure of several types of treated ceramic materials has been conducted using a Norelco diffractometer manufactured by North American Philips, Inc. The results are briefly summarized in the following Table LVII. Accuracy of measurements can be considered to be at least 0.1%.

tense line $d$ spacing 2.867 angstroms, relative intensity 10 1-1-2 planes; next line $d$ spacing 3.162 angstroms, relative intensity 10, 0-2-1 and 2-0-1 planes. There are a number of lesser intense lines. It is important to note, however, that none of the lines with $d$ spacing of 4.077 A.; 2.506 A.; 2.867 A.; 3.162 A. or any of the remaining lines appear on the X-ray diffraction chart of the aluminum oxide ceramic materials which have been treated with phosphoric acid according to the present invention. It is assumed that the phosphoric acid treatment results in or produces a new compound or at best a new crystalline structure which accounts for the improved and unique properties of the treated aluminum oxide materials. The source of information for the X-ray data on aluminum ortho phosphate is the National Bureau of Standards Circular No. 539, Oct. 4, 1960.

TABLE LVII.—X-RAY DIFFRACTION CRYSTAL STRUCTURE IDENTIFICATION

| | Base material | Salt impreg. | Number | $H_3PO_4$ impreg., percent | X-ray diffraction identification |
|---|---|---|---|---|---|
| Sample number: | | | | | |
| A | AHP-99 | None | | None | $Al_2O_3$ |
| B | AP-94 | do | | None | $Al_2O_3$ |
| C | AHP-99 | do | | 85 | $Al_2O_3$ + X |
| D | AP-94 | do | | 85 | $Al_2O_3$ + X |
| E | AHP-99 | $ZrOCl_2$ | 3× | 85 | $Al_2O_3$ + $Zr_2P_2O_7$ + X + ($ZrO_2$, trace) |
| F | AHP-99 | $MgCrO_4$ | 3× | 85 | $Al_2O_3$ + $MgCrO_4$ + X + ($Cr_2O_3$, trace) |
| G | AHP-99 | $MgCrO_4$ | 3× | None | $Al_2O_3$ + $MgCrO_4$ |
| 0-7 | AHP-99 | $CrO_3$ | 3× | None | $Al_2O_3$ + $Cr_2O_3$ |
| K-7 | AHP-99 | $CrO_3$ | 3× | 85 | $Al_2O_3$ + $Cr_2O_3$ + X |
| 0-3 | AP-94 | $CrO_3$ | 3× | None | $Al_2O_3$ + $CrO_3$ |
| L-7 | AP-94 | $CrO_3$ | 1× | 85 | $Al_2O_3$ + $CrO_3$ + X |
| K-8 | AP-94 | $CrO_3$ | 2× | 85 | $Al_2O_3$ + $CrO_3$ + X |
| L-4 | AP-94 | $CrO_3$ | 3× | 85 | $Al_2O_3$ + $CrO_3$ + X |
| L-5 | AP-94 | $CrO_3$ | 4× | 85 | $Al_2O_3$ + $CrO_3$ + X |
| L-6 | AP-94 | $CrO_3$ | 5× | 85 | $Al_2O_3$ + $CrO_3$ + X |
| 8X | AP-94 | $CrO_3$ | 8× | 85 | $Al_2O_3$ + $CrO_3$ + X |

Samples of ceramic material formed using Coors AP-99-L3 alumina base refractory material with single acid treatment only (no oxide impregnation) have been subjected to various nuclear radiation environment.

One such test consisted of exposing small coil forms made of the material to a transient nuclear environment in a fast burst reactor. In this case, the small pieces ($\sim$¼" diameter x ⅛" length) were exposed to a neutron flux rate of $2.8 \times 10^{17}$ n./cm.²-sec. with associated gammas of $6 \times 10^7$ rads/sec. The total dose per burst was $\sim 2.2 \times 10^{12}$ n./cm.² (fast nuetron), $1.8 \times 10^{13}$ n./cm.² (thermal neutrons) and $5 \times 10^3$ rads. No noticeable effect in the ceramic material could be detected.

Another test was conducted in which small samples of the same type ceramic were irradiated for a period of time long enough to accumulate a total exposure of approximately $10^{19}$ ($\geq$mev.). Even with this very high exposure, no physical change in the ceramic part could be detected.

Parts to be fabricated using the method and materials of this invention are first machined to the correct dimensions from the relatively soft, partially sintered, porous refractory base material.

In this original, untreated condition, the material will normally have a Mohs hardness somewhere between 1 to 3 and preferably between 2–3 (such as the Coors AHP-99 and AP-94 alumina).

This hardness range allows machining using ordinary high speed steel or carbide tool bits, drills, cutters, saws, etc. While carbide tooling is recommended for quantity production to reduce tool wear, high speed tool steel will also hold up quite well providing cutting speeds are low to prevent heat buildup at point of contact.

Very fine and intricate parts can be machined and processed from this material. Thin walled parts, such as coil bobbins, can be made with sections as thin as .010" with little difficulty. Also, providing slow speeds are used to prevent heating, holes as small as 1/64" have been drilled to an inch or so in depth.

Recommended lathe turning speeds for small parts (1.4"–2" dia.) are about 250 r.p.m. and drilling should ordinarily be done at speeds of less than 150 r.p.m. Band saw cutting should be at 10 ft./min. or less. Finished parts may also be easily sanded by hand using conventional "wet or dri" type silicon carbide paper with grit size ranging from 100 to 600, depending on the final finish desired.

Since the part will become extremely hard following the chemical treatment and hardening process, the dimensions and surface finish desired in the final cured state should be completed during the initial machinery operation. It is possible to provide final polishing operations after not more than three oxide impregnations using silicon carbide paper. After this point, it will usually be necessary to resort to diamond machining since the hardness of most of the hardened ceramic materials will usually exceed that of silicon carbide.

In order to fabricate a hardened ceramic part according to this invention, the piece, machined from the soft, base refractory material, must next be chemically treated and cured.

The chemical treatment method will normally consist of one of the following: (1) Impregnation in phosphoric acid only; (2) one or more oxide impregnations followed by a single phosphoric acid treatment; (3) one or more oxide impregnations without final acid treatment. The choice of impregnation method will, of course, depend on the final physical, chemical and electrical properties desired, as well as the economic factors involved.

Following each chemical impregnation, the part is elevated in temperature to remove the water (including water of crystallization) and to convert the salt, or acid solution to an inert crystalline structure. A typical impregnation and curing cycle is shown in Table LVIII.

TABLE LVIII.—CURING AND HARDENING CYCLE FOR UNDERFIRED REFRACTORY CERAMICS

| Step | Description | Temperature, °F. | Time, minute |
|---|---|---|---|
| 1 | Heat basic ceramic material | 350 | 20 |
| 2 | Immerse part in salt solution | (¹) | 40 |
| 3 | Cure part | 150–1,000 | 120 |
| 4 | Cool piece to 600° F | 600 | 20 |
| 5 | Immerse in phosphoric acid solution | (¹) | 40 |
| 6 | Harden part | 150–1,000 | 120 |
| 7 | Cool piece to ambient | (¹) | 15 |

¹ Ambient.

The above applies to any part having its thinnest section not exceeding ⅜". For thicker pieces, longer curing cycles (steps 3 and 6) and immersion times (steps 2 and 5) are required. Steps 2 and 3 may be repeated for desired number of salt impregnations, depending on mechanical strength properties desired. Where only acid treatment is desired, steps 2, 3 and 4 can be omitted. In like manner, if only an oxide treatment is to be used, steps 5 and 6 can be omitted.

Many of the refractory ceramic materials of this invention have been found to exhibit excellent characteristics for bearing and seal applications. Even the simple acid treated refractory base materials exhibit a noticeably low coefficient of friction characteristic, suggesting possible bearing use.

Static and sliding coefficient of friction data has been measured for several refractory ceramic materials produced in accordance with the present invention.

Table LIX lists static coefficients determined by sliding various oxide impregnated specimens on a chromic oxide impregnated slide. The slide and most of the oxide impregnated sliders were also given a final phosphoric acid treatment. As can be seen from the data presented in Table LIX, the lowest coefficient is provided by the like materials. The one sample, given four chromic oxide impregnations followed by one zirconium oxide impregnation (plus final acid treatment), produced the highest friction coefficient when sliding against the chromic oxide treated slide.

Table LIX shows that the lowest friction coefficients are generally obtained by sliding identical ceramic materials against each other rather than unlike materials.

TABLE LIX.—COEFFICIENT OF STATIC FRICTION MEASUREMENTS, RUN DRY

| Slider | | | | Slide | | | | | | Friction coefficient |
|---|---|---|---|---|---|---|---|---|---|---|
| Base material | Salt impreg. | Number | H₃PO₄ impreg., percent | Base material | Salt impreg. | Number | H₃PO₄ impreg., percent | Load (lbs.) | Lbf. | |
| AP-94-12 | CrO₃ | 5× | None | AP-94-12 | CrO₃ | 4× | 85 | 62.38 | 8.2 | .131 |
| AP-94-12 | CrO₃ | 5× | 85 | AP-94-12 | CrO₃ | 4× | 85 | 62.38 | 11.4 | .183 |
| AP-94-12 | ZrOCl₂ | 5× | 85 | AP-91-12 | CrO₃ | 4× | 85 | 62.38 | 9.6 | .154 |
| AP-94-12 | MgCrO₄ | 5× | None | AP-94-12 | CrO₃ | 4× | 85 | 62.38 | 9.8 | .157 |
| AP-94-12 | Ni(NO₃)₂ | 5× | 85 | AP-94-12 | CrO₃ | 4× | 85 | 62.38 | 8.8 | .141 |
| AP-94-12 | Co(NO₃)₂ | 5× | 85 | AP-94-12 | CrO₃ | 4× | 85 | 62.38 | 8.3 | .133 |
| AP-94-12 | SnCl₂ | 5× | 85 | AP-94-12 | CrO₃ | 4× | 85 | 62.38 | 9.3 | .149 |
| AP-94-12 | None | | 85 | AP-94-12 | CrO₃ | 4× | 85 | 62.38 | 10.7 | .172 |
| AP-94-12 | {CrO₃ 4× plus ZrOCl₂ 1×} | | 85 | AP-94-12 | CrO₃ | 4× | 85 | 62.38 | 11.3 | .181 |

NOTE.—Contact area of slider$\approx$.6 in.²

Table LX lists coefficients of friction for some common materials and is included for comparison purposes.

TABLE LX.—COEFFICIENT OF STATIC AND SLIDING FRICTION COMPRESSION DATA

| Materials | Static friction, dry | Sliding friction, dry |
|---|---|---|
| Glass on glass | 0.94 | 0.4 |
| Hard steel on hard steel | 0.78 | 0.42 |
| Hard steel on graphite | 0.21 | |
| Hard steel on babbit | 0.70 | 0.33 |
| Brass on mild steel | 0.51 | 0.44 |
| Cast iron on cast iron | 1.10 | 0.15 |
| Teflon on teflon | 0.04 | 0.04 |
| Teflon on steel | 0.04 | 0.04 |
| Tungsten carbide on tungsten carbide | 0.2 | |
| Tungsten carbide on steel | 0.5 | |

NOTE.—Above data from American Institute of Physics Handbook, 1957.

Wear rate test data was obtained with a variety of treated refractory ceramics using a single rub-shoe type test. Both conventional and non-conventional lubricants have been used in these wear rate tests, including #10 SAE motor oil, glycerine, #200 polyethylene glycol, G.E.F.-50 Versilube silicone lubricant, alcohol, gasoline, paraffin, aprizon high vacuum grease, tap water and sea water.

The rub-shoe test arrangement consists of a single shoe riding against the periphery of a rotating wheel. The wheel in these tests have normally been operated at either 60 or 300 rpm. The contact pressure between the shoe and wheel is variable and may be adjusted simply by changing weights on the end of a lever arm to which the shoe is attached. The wheel is directly driven by means of an electric motor. The slow drive speed has been used because wear rates are generally more severe at slow speeds than at high speeds since more surface-to-surface contact can occur through the lubricating film.

Since the shoe has a flat contacting surface, the live contact pressure between shoe and wheel is extremely high at the beginning of the test. As would be expected, therefore, the highest wear is experienced at the start of the test with the wear rate diminishing with time (as the shoe wears, the p.s.i. loading decreases). While this type arrangement is unlike any actual bearing design, it does allow a convenient and rapid means of comparing wear rates.

Table LXI lists the types of treated refractory ceramic materials tested using the rub-shoe arrangement. For the most part, the variations consist in the oxide impregnation employed, which has been found to be a significant factor in the wear properties. Unless otherwise specified, the shoe width has been standardized at 0.25" with a wheel diameter of 1.10".

TABLE LXI.—RUB-SHOE TEST PARTS

| Part number | Base material | 1st impreg. | Number | 2d impreg. | Number | Final impreg., percent | Rockwell hardness | Mohs, hardness | Remarks |
|---|---|---|---|---|---|---|---|---|---|
| W-1 | AP-94-12 | CrO₃ | 5X | None | | None | | 9-10 | |
| W-2 | AP-94-12 | CrO₃ | 5X | ...do | | 85 | | 9-10 | |
| W-3 | AP-94-12 | CrO₃ | 4X | ZrOCl₂ | 1X | 85 | | 9-10 | |
| W-4 | AP-94-12 | | | | | | | | |
| W-5 | AP-94-12 | None | | None | | 85 | | 8-9 | |
| W-6 | AP-94-12 | ZrOCl₂ | 5X | ...do | | 85 | | 9-10 | |
| W-7 | AP-94-12 | MgCrO₄ | 5X | ...do | | None | | 8-9 | |
| W-8 | AP-94-12 | Ni(NO₃)₂ | 5X | ...do | | 85 | | 9-10 | |
| W-9 | AP-94-12 | Co(NO₃)₂ | 5X | ...do | | 85 | | 9-10 | |
| W-10 | AP-94-12 | SnCl₂ | 5X | ...do | | 85 | | 9-10 | |
| W-1-A | AP-94-12 | CrO₃ | 8X | ...do | | 85 | | 9-10 | |
| W-7-A | AP-94-12 | MgCrO₄ | 5X | ...do | | 85 | | | |

Tables LXII through LXVI show comparison runs for various treated refractory ceramic materials using a variety of lubricants. Some comparisons have also been made with conventional bearing materials such as a bearing bronze shoe riding against a mild steel wheel. Such comparisons, however, are not too meaningful since the metal bearings are used only under very lightly loaded conditions with good lubricants or else galling occurs. The better treated refractory ceramic materials under these conditions show negligible wear.

TABLE LXII.—RUB-SHOE WEAR-RATE COMPARISON TESTS

[Load, 10 lbs.; Run time, 1 hr.; Lubricant, alcohol; R.p.m., 300; Wheel diameter, 1.1"; Shoe width, .25"; Base material, AP-94-12]

| Wheel number | Salt impreg. | Number | $H_3PO_4$ impreg., percent | Shoe number | Salt impreg. | Number | $H_3PO_4$ impreg., percent | Wear depth (in.) | Wear length (in.) | Corrected depth (in.) | Wear width (in.) | Wear rate (in./ft.) ×10⁻⁹ | Remarks |
|---|---|---|---|---|---|---|---|---|---|---|---|---|---|
| W-1 | CrO₃ | 5X | None | W-1 | CrO₃ | 5X | None | .000345 | .240 | .00033 | .030 | 65 | |
| W-2 | CrO₃ | 5X | 85 | W-2 | CrO₃ | 5X | 85 | .00029 | .235 | .00027 | .030 | 53 | |
| W-3 | CrO₃ + ZrOCl₂ | {4X, 1X} | 85 | W-3 | CrO₃ + ZrOCl₂ | {4X, 1X} | 85 | .00010 | .250 | .00010 | .025 | 20 | |
| W-5 | None | | 85 | W-5 | None | | 85 | .000885 | .250 | .00089 | .060 | 175 | |
| W-6 | ZrOCl₂ | 5X | 85 | W-6 | ZrOCl₂ | 5X | 85 | .00075 | .250 | .00075 | .060 | 147 | |
| W-7 | MgCrO₄ | 5X | None | W-7 | MgCrO₄ | 5X | None | .000485 | .250 | .00049 | .045 | 96 | |
| W-8 | Ni(NO₃)₂ | 5X | 85 | W-8 | Ni(NO₃)₂ | 5X | 85 | .000465 | .250 | .00047 | .050 | 92 | |
| W-9 | Co(NO₃)₂ | 5X | 85 | W-9 | Co(NO₃)₂ | 5X | 85 | .00125 | .250 | .00103 | .075 | 200 | |
| W-10 | SnCl₂ | 5X | 85 | W-10 | SnCl₂ | 5X | 85 | .00055 | .250 | .00055 | .050 | 107 | |
| W-1-A | CrO₃ | 8X | 85 | W-1-A | CrO₃ | 8X | 85 | .00000 | N.M. | .00000 | N.M. | 0 | |

TABLE LXIII.—RUB-SHOE WEAR-RATE COMPARISON TESTS

[Load, 10 lbs.; Run time, 2 hrs.; Lubricant, alcohol; R.p.m., 300; Wheel diameter, 1.1"; Shoe width, .25"; Base material, AP-94-12]

| Wheel number | Salt impreg. | Number | $H_3PO_4$ impreg., percent | Shoe number | Salt impreg. | Number | $H_3PO_4$ impreg., percent | Wear depth (in.) | Wear length (in.) | Corrected depth (in.) | Wear width (in.) | Wear rate (in./ft.) ×10⁻⁹ | Remarks |
|---|---|---|---|---|---|---|---|---|---|---|---|---|---|
| W-1 | CrO₃ | 5X | None | W-1 | CrO₃ | 5X | None | .00050 | .235 | .00047 | .045 | 46 | |
| W-2 | CrO₃ | 5X | 85 | W-2 | CrO₃ | 5X | 85 | .00041 | .220 | .00036 | .035 | 35 | |
| W-3 | CrO₃ + ZrOCl₂ | {4X, 1X} | 85 | W-3 | CrO₃ + ZrOCl₂ | {4X, 1X} | 85 | .000315 | .220 | .00028 | .035 | 28 | |
| W-2 | CrO₃ | 5X | 85 | W-9 | Co(NO₃)₂ | 5X | 85 | .0093 | .245 | .00091 | .055 | 89 | |
| W-9 | Co(NO₃)₂ | 5X | 85 | W-2 | CrO₃ | 5X | 85 | .0071 | .250 | .00071 | .060 | 70 | |
| W-3 | CrO₃ + ZrOCl₂ | {4X, 1X} | 85 | W-2 | CrO₃ | 5X | 85 | .0026 | .230 | .00024 | .030 | 24 | |
| W-2 | CrO₃ | 5X | 85 | W-3 | CrO₃ + ZrOCl₂ | {4X, 1X} | 85 | .0031 | .200 | .00025 | .040 | 25 | |
| W-3 | CrO₃ + ZrOCl₂ | {4X, 1X} | 85 | W-3 | CrO₃ + ZrOCl₂ | {4X, 1X} | 85 | .00001 | .220 | .00021 | .035 | 21 | Re-run wheel well polished. |
| W-1-A | CrO₃ | 8X | 85 | W-1-A | CrO₃ | 8X | 85 | .000045 | .215 | .00004 | .020 | 4 | |
| W-8 | Ni(NO₃)₂ | 5X | 85 | W-8 | Ni(NO₃)₂ | 5X | 85 | .000765 | .245 | .00075 | .065 | 74 | |

TABLE LXIV.—RUB-SHOE WEAR-RATE COMPARISON TESTS

[Load, 10 lbs.; Run time, 1 hr.; Lubricant, H₂O; R.p.m., 300; Wheel diameter, 1.1"; Shoe width, .25"; Base material, AP-94-12]

| Wheel number | Salt impreg. | Number | $H_3PO_4$ impreg., percent | Shoe Number | Salt impreg. | Number | $H_3PO_4$ impreg., percent | Wear depth (in.) | Wear length (in.) | Corrected depth (in.) | Wear width (in.) | Wear rate (in./ft.) ×10⁻⁹ | Remarks |
|---|---|---|---|---|---|---|---|---|---|---|---|---|---|
| W-1-A | $CrO_3$ | 8× | 85 | W-1-A | $CrO_3$ | 8× | 85 | N.M. | N.M. | N.M. | N.M. | N.M. | High wear. |
| W-3 | $CrO_3$ + $ZrOCl_2$ | {4× 1×} | 85 | W-3 | $CrO_3$ + $ZrOCl_2$ | {4× 1×} | 85 | .000135 | .190 | .000103 | .025 | 20 | |
| W-2 | $CrO_3$ | 5× | 85 | W-2 | $CrO_3$ | 5× | 85 | .000145 | .245 | .000142 | .035 | 28 | |
| W-5 | None | | 85 | W-5 | None | | 85 | N.M. | N.M. | N.M. | N.M. | N.M. | High wear. |
| W-6 | $ZrOCl_2$ | 5× | 85 | W-6 | $ZrOCl_2$ | 5× | 85 | N.M. | N.M. | N.M. | N.M. | N.M. | Squeaks. |
| W-7 | $MgCrO_4$ | 5× | None | W-7 | $MgCrO_4$ | 5× | None | .00094 | .250 | .000940 | .070 | 177 | |
| W-8 | $Ni(NO_3)_2$ | 5× | 85 | W-8 | $Ni(NO_3)_2$ | 5× | 85 | N.M. | N.M. | N.M. | N.M. | N.M. | Squeeks. |
| W-9 | $Co(NO_3)_2$ | 5× | 85 | W-9 | $Co(NO_3)_2$ | 5× | 85 | N.M. | N.M. | N.M. | N.M. | N.M. | Do. |
| W-10 | $SnCl_2$ | 5× | 85 | W-10 | $SnCl_2$ | 5× | 85 | .00286 | .230 | .000263 | .115 | 52 | |
| W-2-A | $CrO_3$ | 5× | 85+ $AlPO_4$ | W-2-A | $CrO_3$ | 5× | 85+ $AlPO_4$ | .000055 | .225 | .000050 | .020 | 10 | |

TABLE LXV.—LUBRICANT COMPARISON RUNS USING W-8 RUB-SHOE

[NiO=5×impregnation]

| Run number | Lubricant | Load (lbs.) | Run time (hrs.) | R.p.m. | Wear depth (in.) | Wear length (in.) | Corrected depth (in.) | Wear width (in.) | Wear rate (in./ft.), ×10⁻⁹ | Remarks |
|---|---|---|---|---|---|---|---|---|---|---|
| 1 | Alcohol | 30 | 2 | 300 | .000765 | .245 | | .065 | 74 | |
| 2 | Polyethylene glycol | 30 | 2 | 300 | .000405 | .250 | .000248 | .050 | 24 | |
| 3 | Tap water | 30 | 2 | 300 | N.M. | N.M. | N.M. | N.M. | N.M. | |
| 4 | #10 SAE oil | 30 | 2 | 300 | .000005 | .175 | | .010 | | |
| 5 | Paraffin | 30 | 2 | 300 | | | | | | |

TABLE LXVI.—LUBRICANT COMPARISON RUNS USING W-3 RUB-SHOE

[$CrO_3$=8× impregnation]

| Run number | Lubricant | Load (lbs.) | Run time (hrs.) | R.p.m. | Wear depth (in.) | Wear length (in.) | Corrected depth (in.) | Wear width (in.) | Wear rate in./ft.), ×10⁻⁹ | Remarks |
|---|---|---|---|---|---|---|---|---|---|---|
| 1 | Tap water | 30 | 2 | 300 | N.M. | N.M. | N.M. | N.M. | N.M. | |
| 2 | Alcohol | 30 | 2 | 300 | .00001 | .220 | | .035 | .88 | |
| 3 | #10 SAE oil | 30 | 2 | 300 | .000005 | .235 | | .025 | .49 | |
| 4 | Tap water | 10 | 1 | 300 | | | | | | |

The treated refractory ceramic material has been found to perform most satisfactorily as a bearing when used against a like material. This is unlike metal bearings where different metals are invariably used to achieve low wear rates. The reason for this behavior is not fully understood.

The Bearings and Seals branch of the Marine Engineering Laboratory of the U.S. Navy Department employs a single rub-shoe test for their sea water lubricated materials. In this case, the shoe has a 1" width (usually made as a 1" cube) and rides on a 1¼" wide x 2" diameter wheel. The r.p.m. is adjustable over a range of from 3 to 300. The standard loading is 4 lbs.

Similar tests were conducted using several of the single oxide impregnated chemically treated and hardened ceramic materials. Wear rates were measured to be between $1.55 \times 10^{-9}$ and $3.1 \times 10^{-9}$ inches of wear/ft. of travel with 1" contact length, 4 lbs. load at point of contact, 60 r.p.m. wheel speed, sea water lubrication and 92 hours running time. This is at least two orders of magnitude less wear than with the titanium carbide/carbon combination presently being used for submarine seals by the M.E.L. Multi-oxide impregnated materials provide even lower wear rates.

Life tests have been made on several bearing configurations. They have been lubricated with various oils and water. Two oil lubricated bearings have a total running time to date of over 6615 hours at 1800 r.p.m. without any visible signs of wear. A radially loaded dual bearing had one bearing running in #10 SAE motor oil and the other running under sea water operated at 3200 r.p.m. The load on these bearings totals 1.5 pounds. These bearings have been operated continuously for over 5272 hours with no sign of wear. It should be noted that a bearing to be used with or under water should be cured at a temperature which is at least sufficiently high to drive all of the water of crystallization out of the ceramic and convert the structure thereof to a water-insoluble state. As indicated previously, this temperature is found to be at least about 600° F. to about 1000° F. for the aluminum oxide ceramics.

It will be appreciated that these bearings have marine applications in a submersible system and would not require special seals, special lubrication or added buoyancy problems. Silicone lubricated bearings would be useful in low temperature applications and the bearings are also useful in liquid metal lubricated systems.

From room temperature to 600° F., the coefficient of the treated refractory ceramic materials has been found to remain extremely low. The ceramic materials exhibit a higher friction coefficient between about 800° F. and 1200° F. Above this temperature, however, it again begins to slide more freely, attaining a reasonable low coefficient as 2000° F. temperatures are approached. Since this behavior of increasing and then decreasing friction with temperature is almost identical to that reported for fully vitrified aluminum oxide ceramics, it is expected that the aluminum oxide base of the treated refractory ceramic is the major contributing factor to the related elevated temperature behavior.

The fact that the treated refractory material can be fabricated with a relatively high degree of porosity suggests the possible use of solid lubricants. This can be accomplished by impregnating the porous ceramic with a salt solution convertible to a solid lubricant, such as a salt of molybdenum or cadmium, and converting same in situ to the sulfide.

A variation in the chemical hardening and salt impregnation method of this invention results in an excellent abrasive material for the honing and finishing of metals. When treated correctly, such an abrasive stone will remove metal very rapidly in addition to having the feature of not loading the stone with metal particles.

The basic material found to be most satisfactory for this purpose is Coors AHP-99 aluminum oxide, although others have been found to be satisfactory. The chemical hardening treatment is different than that used to process standard treated ceramic parts and bearings, however.

After machining to the desired shape, the ceramic material is first treated with a reduced strength or starved phosphoric acid solution of less than 85% and then cured at at least 600° F. Following this, a salt impregnation may be added and the piece re-cured at a temperature sufficient to convert the salt to an oxide. (For standard ceramic pieces, the salt impregnation is made prior to the chemical hardening treatment.) This procedure has been found to retain a high degree of porosity, in addition to providing the necessary low loading of the pores and rapid cutting properties. It will be noted that 85% phosphoric acid saturated with aluminum phosphate will also provide the necessary starved acid solution.

The most significant advantages of this new abrasive material should be in the fact that the desired shapes and close tolerances can be generated prior to the hardening of the abrasive. When using sintering techniques in the production of abrasives, a high proportion of the expense is in the grinding and finishing operations. A further advantage of the present process may be in the low temperature-short time cycle involved in the curing and hardening process, as compared to the presently employed high temperature sintering method. Tables LXVII and LXVIII illustrate a variety of abrasive materials resulting from varying the acid concentration and the impregnant.

to higher potentials as follows: 6 kv.-4.8 μa.; 12 kv.-11 μa.; 18 kv.-15.5 μa.; 24 kv.-23 μa.; and, 30 kv.-31 μa.

While it is not known exactly what occurs when the underfired, porous, substantially pure refractory oxide ceramic is impregnated with phosphoric acid and cured, it is believed that possibly due to the nascent character of the surfaces of the porous structure, a chemical reaction or reorientation occurs as possibly evidenced by the unidentified line on the X-ray diffraction analysis. The pores of the porous starting material appear to be packed with a reaction product to provide an increase in the density of the treated material. The packing of the reaction product within the pores of the skeletal refractory base material appears to provide support therefor and when the density approaches the maximum, the hardness and strength of the material approaches a maximum.

Certain oxide additives, such as chromic oxide, when impregnated into substantially pure porous refractory oxides, will provide a substantial enhancement of the hardness and strength of such material without further treatment. Here again, the mechanism by which this is accomplished is not fully understood. It is not certain whether a true reaction occurs between the refractory base material and the oxide formed, whether there is a chemical linkage or sharing of electrons or whether the

TABLE LXVII.—HONING MATERIAL TESTS USING VARIOUS ACID CONCENTRATIONS

| | | 1st treatment | | | | | | |
|---|---|---|---|---|---|---|---|---|
| Sample number | Base material | 85% $H_3PO_4$ | $H_2O$, parts by volume | Salt impregnation | Hardness | Characteristics | Rating | Grade |
| 1-H | AHP-99 | (1) | (1) | None | | Grabs and slips | Poor | |
| 2-H | AHP-99 | (1) | (1) | $CrO_3$ | | do | do | |
| 3-H | AHP-99 | (1) | (1) | $ZrOCl_2$ | | do | do | |
| 4-H | AHP-99 | (1) | (2) | None | | Not as good as 5-6 | Good | Coarse. |
| 5-H | AHP-99 | (1) | (2) | $CrO_3$ | | Fast cutting | Excellent | Do. |
| 6-H | AHP-99 | (1) | (2) | $ZrOCl_2$ | | do | do | Do. |
| 7-H | AHP-99 | (1) | (3) | None | | Not as good as 8-9, only good cutting | Good | Do. |
| 8-H | AHP-99 | (1) | (3) | $CrO_3$ | | Fast cutting | Excellent | Do. |
| 9-H | AHP-99 | (1) | (3) | $ZrOCl_2$ | | do | do | Do. |
| 10-H | AHP-99 | (1) | (4) | None | | Not as good as 11-12, fairly fast cutting | Good | Do. |
| 11-H | AHP-99 | (1) | (4) | $CrO_3$ | | Not as good as 12 | Excellent | Do. |
| 12-H | AHP-99 | (1) | (4) | $ZrOCl_2$ | | Fast cutting | do | Do. |

TABLE LXVIII.—HONING MATERIAL TESTS USING VARIOUS OXIDE IMPREGNATIONS

| | | 1st treatment | | | | | | |
|---|---|---|---|---|---|---|---|---|
| Sample number | Base material | 85% $H_3PO_4$ | $H_2O$ parts by volume | Salt impregnation | Hardness | Characteristics | Rating | Grade |
| 1-Q | AHP-99 | (1) | (2) | $Be(NO_3)_2$ | | Grabs very slightly | Excellent | Fine. |
| 4-Q | AHP-99 | (1) | (2) | $Ni(NO_3)_2$ | | Grabs slightly | Good | Med. fine. |
| 5-Q | AHP-99 | (1) | (2) | $Th(NO_3)_2$ | | Fairly fast cutting | do | Med. coarse. |
| 6-Q | AHP-99 | (1) | (2) | $SnCl_2$ | | Fast cutting | Excellent | Coarse. |
| 7-Q | AHP-99 | (1) | (2) | $Ti_2(C_2O_4)_3$ | | do | do | Do. |
| 8-Q | AHP-99 | (1) | (2) | $Zr(NO_3)_2$ | | do | do | Do. |
| 9-Q | AHP-99 | (1) | (2) | $MgCrO_4$ | | About same as 5-Q | Good | Med. coarse. |
| 6-H | AHP-99 | (1) | (2) | $ZrOCl_2$ | | | Excellent | Coarse. |
| 5-H | AHP-99 | (1) | (2) | $CrO_3$ | | | do | Do. |
| 17-Q | AHP-99 | (1) | (2) | $Cu(NO_3)_2$ | 5-6 | Fast cutting | Excellent | Fine. |
| 18-Q | AHP-99 | (1) | (2) | $FeCl_2$ | 4-5 | Fairly fast cutting | Good | Med. |
| 19-Q | AHP-99 | (1) | (2) | $La(NO_3)_2$ | 3-4 | Very fast cutting | Excellent | Coarse. |
| 20-Q | AHP-99 | (1) | (2) | $LiC_2H_3O_2$ | 3-4 | Fast cutting | do | Med. |
| 21-Q | AHP-99 | (1) | (2) | $Sr(NO_3)_2$ | 6-7 | Slips slightly | Good | Med. coarse. |
| 22-Q | AHP-99 | (1) | (2) | $H_4SiW_{16}O_{40}$ | 5-6 | Very fast cutting | Excellent | Coarse. |

It was further found that, on impregnating and curing the aluminum oxide several times with chromic acid, there is produced a material which exhibits marked changes in conductivity, both electrical and heat conductivity, with changes in temperature. As an example, a piece of Coors AP-99-L3 aluminum oxide 0.625 inches in diameter and 0.040 inches thick was impregnated with chromic acid and cured through seven cycles and then given a final phosphoric acid treatment and cure. This specimen exhibited an electrical resistance of 185K ohms at 45° F. When heated to 70° F., this specimen had an electrical resistance of 80K ohms, and at 1000° F., the resistance dropped to 6.5 ohms. Another piece of Coors AP-99-L3 aluminum oxide 2.0 inches long and 0.25 inches in diameter was given a single chromic oxide impregnation. This piece was subjected to increasing voltage gradients over its length and displayed increasing current conductance oxide is merely physically deposited. It would appear that something akin to a chemical bonding occurs. This is further borne out by the finding that when the refractory aluminum oxide base material is impregnated with phosphoric acid and cured, the thus treated material will not respond to or react with the oxide producing material. Where one or several impregnations with an oxide producing material has been made and appropriately cured, further impregnations and cures with the oxide producing materials will usually result in further accumulation of the oxide; however, once the phosphoric acid is impregnated into the refractory base material and cured, the base material will not materially be enhanced by any further oxide additions. This would appear to indicate a completion of a chemical reaction between the refractory base oxide and the phosphoric acid on being cured to produce the unidentified reaction product having a plane spacing of 4.12 angstroms.

It has further been found that the higher the purity of the porous refractory oxide base material, the harder the treated and cured product. Using as a starting material Coors AP–99–L3 which contains 99% aluminum oxide, it is possible to produce a hardness of Rockwell A–90 with the treating process of this invention. The base material can be treated with either phosphoric acid or a salt convertible to an oxide or both. The phosphoric acid appears to react with the base or skeletal oxide and possibly with the added oxide as well. While phosphoric acid is to be preferred from the point of ease of use, other materials may be used as the source of the phosphate ion which are capable of releasing same such as sodium phosphate and sodium triphosphate in solution.

While there have been described what at present are considered to be the preferred embodiments of this invention, it will be obvious to those skilled in the art that various changes and modifications may be made therein without departing from the invention. It is aimed, therefore, in the appended claims to cover all such changes and modifications which fall within the true spirit and scope of the invention.

What is claimed is:

1. A chemically hardened underfired partially vitrified refractory ceramic oxide body having a skeletal core of refractory oxide, said core having an unfilled effective porosity of at least from about 13% to about 46% with said pores having substantial deposits within its interstices throughout the body of a metal oxide and a reaction product of phosphoric acid and the skeletal oxide.

2. The ceramic oxide body of claim 1 wherein the refractory oxide body consists of refractory oxide selected from the group consisting of the oxides of aluminum, barium, beryllium, calcium, cerium, chromium, cobalt, gallium, hafnium, lanthanum, magnesium, manganese, nickel, niobium, tantalum, thorium, tin, titanium, uranium, vanadium, yttrium, zinc, zirconium and mixtures thereof.

3. The ceramic body of claim 1 wherein the refractory oxide body is selected from the group consisting of the oxides of aluminum, beryllium, magnesium, titanium, zirconium, and mixtures thereof.

4. The refractory body of claim 1 wherein the metal oxide is selected from the group consisting of the oxides of aluminum, beryllium, cadmium, calcium, cerium, chromium, cobalt, copper, iron, lanthanum, lithium, magnesium, molybdenum, nickel, strontium, tin, tungsten, zinc and zirconium.

5. The ceramic body of claim 1 wherein the skeletal core is of at least about 85% aluminum oxide.

6. The ceramic body of claim 1 wherein the skeletal core is of at least about 96% beryllium oxide.

7. The ceramic body of claim 1 wherein the skeletal core is of at least about 89% magnesium oxide.

8. The ceramic body of claim 1 wherein the skeletal core is of at least about 95% zirconium oxide.

9. The ceramic body of claim 1 wherein the skeletal core is of at least about 98% titanium dioxide.

10. The method of producing a chemically hardened refractory ceramic body which comprises providing a core of a porous underfired partially vitrified machinable refractory ceramic oxide, heating the core to about 250° F., immersing the core in a solution of a soluble chromium, curing the impregnated core and converting the chromium compound to chromium oxide in situ by raising the temperature of the core from about 150° F. to at least about 600° F. in increments over a period of time to dry and cure the core and to convert the compound to the oxide, cooling the core to not less than about 300° F. and immersing same in phosphoric acid for a period of time sufficient for the phosphoric acid to impregnate said core and curing said core by raising the temperature of said core from about 150° F. to at least about 600° F. in increments over a period of time sufficient to completely dry and harden the ceramic.

11. The method of claim 10 wherein the chromium compound is chromic acid.

12. The method of claim 10 wherein the chromium compound is magnesium chromate.

13. The method of claim 10 wherein aluminum phosphate is dissolved in said phosphoric acid and is impregnated into said core with said acid, with said compound being converted to the oxide in situ in said core during the curing thereof.

14. The method of claim 10 wherein the porous refractory ceramic oxide has an effective porosity of from about 13% to about 46% and has an average pore size of not more than about two microns.

15. The method of claim 10 wherein the porous refractory ceramic oxide has an effective porosity of at least 30%.

16. The method of producing a hardened refractory ceramic body which comprises providing a core of a porous underfired partially vitrified machinable refractory ceramic oxide, substantially completely impregnating said core with a solution of a soluble metal compound which compound is capable of being converted to an oxide on heating to a temperature below the vitrification temperature of the ceramic oxide, curing said impregnated core by raising the temperature thereof to at least 600° F. but less than the vitrification temperature of the ceramic oxide over a period of time sufficient to convert the metal compound impregnated therein to an oxide, impregnating the core with phosphoric acid and curing said phosphoric acid impregnated core by raising the temperature thereof to at least 600° F. over a period of time sufficient to completely dry and harden the ceramic.

17. The method of claim 16 wherein the metal compound is selected from the group consisting of aluminum, beryllium, cadmium, calcium, cerium, chromium, cobalt, copper, iron, lanthanum, lithium, magnesium, molybdenum, nickel, strontium, tin, tungsten, zinc and zirconium compounds.

18. The method of claim 16 wherein aluminum phosphate is dissolved in said phosphoric acid and is impregnated into said core with said acid, with said compound being converted to the oxide in situ in said core during the curing thereof.

19. The method of claim 16 wherein the porous refractory ceramic oxide has an effective porosity of from about 13% to about 46% and has an average pore size of not more than about two microns.

20. The method of claim 16 wherein the porous refractory ceramic oxide has an effective porosity of at least 30%.

21. The method of claim 16 wherein the metal compound is a chromium compound.

22. The method of claim 21 wherein the chromium compound is magnesium chromate.

23. The method of claim 21 wherein the chromium compound is chromic acid.

References Cited

UNITED STATES PATENTS

| | | | |
|---|---|---|---|
| 3,219,730 | 11/1965 | Bliton et al. | 117—169 R |
| 2,805,174 | 9/1957 | Veale | 117—113 |
| 2,325,553 | 7/1943 | Schleicher et al. | 117—169 R |
| 3,717,497 | 2/1973 | Stradley et al. | 117—169 R |

CAMERON K. WEIFFENBACH, Primary Examiner

U.S. Cl. X.R.

117—98, 123 A